(12) United States Patent
Zhou et al.

(10) Patent No.: US 12,169,233 B2
(45) Date of Patent: Dec. 17, 2024

(54) COMMUNICATION METHOD AND APPARATUS

(71) Applicant: HUAWEI TECHNOLOGIES CO., LTD., Guangdong (CN)

(72) Inventors: Wei Zhou, Shanghai (CN); Xiaoqing Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/325,566

(22) Filed: May 30, 2023

(65) Prior Publication Data

US 2023/0305138 A1 Sep. 28, 2023

Related U.S. Application Data

(63) Continuation of application No. PCT/CN2020/133133, filed on Dec. 1, 2020.

(51) Int. Cl.
*G01S 13/86* (2006.01)
*H04J 3/06* (2006.01)
*H04L 67/12* (2022.01)

(52) U.S. Cl.
CPC .......... *G01S 13/867* (2013.01); *H04J 3/0638* (2013.01); *H04L 67/12* (2013.01)

(58) Field of Classification Search
CPC ....... G01S 13/867; H04J 3/0638; H04L 67/12
See application file for complete search history.

(56) References Cited

U.S. PATENT DOCUMENTS

| 10,724,828 | B2  |    | 7/2020  | Hamilton |             |
|------------|-----|----|---------|----------|-------------|
| 11,546,074 | B2  | *  | 1/2023  | Zinner   | H04L 12/40  |
| 2020/0142073 | A1 | * | 5/2020  | Gassend  | G01S 17/89  |
| 2021/0356561 | A1 | * | 11/2021 | Li       | G01S 7/4095 |
| 2022/0046280 | A1 | * | 2/2022  | Iguchi   | H04N 19/46  |
| 2022/0278745 | A1 | * | 9/2022  | Qu       | H04W 56/0015|
| 2023/0006751 | A1 | * | 1/2023  | Zinner   | H04L 63/0428|

(Continued)

FOREIGN PATENT DOCUMENTS

| CN | 101949715 A | 1/2011 |
|----|-------------|--------|
| CN | 109905194 A | 6/2019 |

(Continued)

OTHER PUBLICATIONS

Zeba Idrees et al: "IEEE 1588 for Clock Synchronization in Industrial IoT and Related Applications: A Review on Contributing Technologies, Protocols and Enhancement Methodologies," IEEE Access, vol. 8, (2020); pp. 155660-155678 (20 total pages).

*Primary Examiner* — Blake J Rubin
(74) *Attorney, Agent, or Firm* — Rimon PC

(57) ABSTRACT

Embodiments of this application generally disclose a communication method and apparatus. The method is applied to an intelligent device, and the intelligent device includes a plurality of sensors. The method includes determining N target sensors from a plurality of sensors, where N is an integer greater than 1. The method also includes, correcting to respective second moments of the N target sensors to a first moment of a first clock. According to embodiments of this application, time of different sensors in the intelligent device can be synchronized, to improve an accuracy for a fusion of data collected by the different sensors.

16 Claims, 16 Drawing Sheets

(56) References Cited

U.S. PATENT DOCUMENTS

| | | | | |
|---|---|---|---|---|
| 2023/0121051 A1* | 4/2023 | Wang | ............... | G08G 1/08 701/117 |
| 2023/0155806 A1* | 5/2023 | Abdelhameed | ......... | H04L 12/40 370/503 |

FOREIGN PATENT DOCUMENTS

| | | | |
|---|---|---|---|
| CN | 110967064 | A | 4/2020 |
| CN | 111585682 | A | 8/2020 |
| CN | 111740800 | A | 10/2020 |
| CN | 111917709 | A | 11/2020 |
| WO | 2020199116 | A1 | 10/2020 |

* cited by examiner

COMMUNICATION METHOD AND APPARATUS

CROSS-REFERENCE TO RELATED APPLICATIONS

This application is a continuation of International Application No. PCT/CN2020/133133, filed on Dec. 1, 2020, the disclosure of which is hereby incorporated by reference in its entirety.

TECHNICAL FIELD

Embodiments of this application generally relate to the field of time synchronization technologies, and in particular, to a communication method and apparatus.

BACKGROUND

During autonomous driving and assisted driving, an intelligent vehicle usually needs to sense an ambient environment by using various sensors. Typical sensors for an intelligent vehicle include a millimeter wave radar, a camera, a laser radar, and the like. The intelligent vehicle may detect and classify the ambient environment of the vehicle by using these sensors, transmit obtained information to a planning and control module for a decision on a future driving path of the vehicle, and then execute the decision by using an actuator, to complete an entire assisted driving or autonomous driving process.

Different types of sensors usually have different characteristics, advantages, and disadvantages. For example, the millimeter wave radar can work in all weather conditions, and has high distance measurement and speed measurement accuracy, but may have poor classification capabilities. The camera has a strong resolution and strong target classification capabilities, but may have poor capabilities to perform distance measurement and speed measurement due to an inherent loss of depth information. In addition, the laser radar may receive sufficient depth information and can perform distance measurement and speed measurement, but may have a limited distance for detection. As described above, different types of sensors have different characteristics. Therefore, under different function requirements, data collected by various types of sensors typically needs to be fused, to obtain higher-precision and more comprehensive data. In this way, better environment sensing, road condition analysis, and the like are implemented.

Therefore, how to implement accurate fusion of data collected by sensors is an urgent problem to be resolved.

SUMMARY

Embodiments of this application provide a communication method and apparatus, so as to synchronize time of different sensors in a same device, thereby ensuring accurate fusion of data collected by the different sensors.

According to a first aspect, an embodiment of this application provides a communication method, applied to an intelligent device, where the intelligent device includes a plurality of sensors. The method includes: determining N target sensors from the plurality of sensors, where N is an integer greater than 1, and correcting respective second moments of the N target sensors to a first moment of a first clock.

According to the method provided in the first aspect, in the intelligent device that includes the plurality of sensors, (for example, an intelligent vehicle or an intelligent robot with an autonomous driving function), time synchronization may be performed on respective local clocks of some or all sensors based on a reference clock (the first clock), to correct a moment of each sensor, thereby facilitating for obtaining a moment after the time synchronization is performed based on the reference clock. In this way, when data fusion or data comparison needs to be performed on data collected by some or all of the sensors, because the time of the sensors are synchronized, accuracy of the time information (for example, a collection completion moment of the data) of the data collected by the sensors can be ensured. In this way, accuracy of the data fusion or data comparison can be ensured, for example, the data fusion can be ensured to be effectively completed. When data of the plurality of sensors is fused, and there is no consideration whether time between the sensors is synchronized, may result in data collected for the various sensors at different times to be fused. Further, this may also lead to data of the various sensors that is actually measured at the same time to be collected at different time. Accordingly, data that is collected at an actual same time cannot be smoothly fused, and data collected at different times may be incorrectly fused. This causes the intelligent vehicle to generate a target false alarm and may perform unnecessary automatic emergency braking. This may result in endangering the driving safety of its users and the surroundings of the intelligent vehicle. In conclusion, in some possible embodiments, for example, in an autonomous driving scenario, accurate and effective fusion processing may be achieved on the data of the plurality of time-synchronized sensors. This facilitates for more comprehensive and accurate road condition analysis, environment sensing, and the like, and also improves driving comfort and safety.

In a possible implementation, the method may further include: determining clock frequency offsets between respective clocks of the N target sensors and the first clock and determining respective transmission delays of the N target sensors based on a preset time synchronization protocol: and performing time synchronization on the N target sensors based on the clock frequency offsets between the respective clocks of the N target sensors and the first clock, and the respective transmission delays of the N target sensors.

In some embodiments, the clock frequency offsets between the respective clocks of the plurality of sensors and the reference clock may be determined and the respective transmission delays of the plurality of sensors may be determined based on the preset time synchronization protocol (such as a generalized precision time protocol (gPTP) and a network time protocol (NTP)). Then, time synchronization is performed on the plurality of sensors based on the clock frequency offsets between the respective clocks of the plurality of sensors and the reference clock, and the respective transmission delays of the plurality of sensors. In this way, respective moments of the plurality of sensors may be corrected. For example, speeds of the respective clocks of the plurality of sensors may be determined based on the time synchronization, and then the respective moments may correspondingly increase or decrease. Further, clock frequencies of the respective clocks of the plurality of sensors and a clock frequency of the reference clock may be adjusted to a consistent frequency. In this way, when the data collected by the plurality of time-synchronized sensors is subsequently fused, accurate data fusion may be performed based on the accurate time information of each piece of time-synchronized data. In some possible embodiments, the reference clock may be a clock of a controller or a clock of any sensor.

In a possible implementation, the method may further include: obtaining current status information of the intelligent device, where the status information includes at least one of speed information, direction information, and scenario information: and determining the preset time synchronization protocol based on the status information. The preset time synchronization protocol belongs to a time synchronization protocol set, and the time synchronization protocol set includes at least one of a gPTP, an NTP, a time-sync protocol for sensor network (TPSN), and reference broadcast synchronization (RBS).

In some embodiments, a time synchronization protocol that is to be used for current time synchronization may be further determined based on one or more of current speed information (for example, a current speed of the intelligent vehicle), direction information (information such as turning left, turning right or turning around of the intelligent vehicle), and scenario information (a scenario such as a turn-left curve, a turn-right curve, a U-shaped curve, a bridge, a muddy road and a highway) of the intelligent device. The time synchronization protocol may belong to a time synchronization protocol set. The time synchronization protocol set may include a gPTP and an NTP, and may further include another feasible time synchronization protocol such as a TPSN protocol, RBS or the like. This is not limited in some embodiments. In this way, for example, in a scenario in which a precision requirement of time synchronization is high, such as a curve, especially a U-shaped curve, time synchronization that does not meet the requirement usually causes a large detection deviation of a target detection position. In this case, the gPTP having a high time synchronization precision may be selected to perform time synchronization on the plurality of sensors. For another example, when a vehicle speed is high, a requirement for time synchronization is high, and time synchronization that does not meet the requirement causes poor speed fusion effect of a target vehicle. In this case, the gPTP having a high time synchronization precision may be selected to perform time synchronization on the plurality of sensors. For another example, a lateral control function such as lane centering control (LCC) having a higher requirement on time synchronization may be selected rather than a longitudinal control function such as adaptive cruise control (ACC), where the time synchronization that does not meet the requirements may cause failure of the lateral function control. In this way, when it is detected that the current intelligent vehicle is in the LCC, the gPTP having a high time synchronization precision may be selected to perform time synchronization on the plurality of sensors. When it is detected that the current intelligent vehicle is in the ACC, the NTP having a low time synchronization precision may be selected to perform time synchronization on the plurality of sensors. In this way, an actual requirement for time synchronization precision can be met when all of the plurality of sensors are not used. In addition, a calculation amount and costs can be reduced by using a time synchronization protocol having a low precision when the precision requirement is low:

In a possible implementation, the method may further include: obtaining the first clock based on a preset time synchronization cycle.

In some embodiments, a specific time synchronization cycle may be set, and when triggered by the cycle, a reference clock used for time synchronization is obtained, to perform periodic time synchronization. In this way, a case in which a time of each sensor is out of synchronization after time synchronization has been performed after a period of time can be avoided. In this way, it is ensured that the time of the plurality of sensors can be synchronized in real time. Therefore, when the data collected by the plurality of sensors needs to be fused, accuracy of data fusion of the plurality of sensors is ensured.

In a possible implementation, the method may further include: receiving synchronization request messages respectively sent by M target sensors in the plurality of sensors, where the synchronization request messages are messages sent after the M target sensors collect data at the respective second moments, the M target sensors belong to the N target sensors, and M is an integer greater than or equal to 1: and obtaining the first clock based on the synchronization request messages respectively sent by the M target sensors.

In some embodiments, the reference clock may be obtained in an event triggering manner, to perform time synchronization. For example, obtaining the reference clock may be triggered based on synchronization request messages sent by one or more sensors after data is collected, so as to perform time synchronization. It may be understood that the one or more sensors may be sensors that have a data fusion requirement. After collecting the data, the one or more sensors determine that data fusion needs to be performed on the data of another sensor, and time synchronization needs to be performed on the another sensor before the data fusion, to ensure accuracy of the data fusion. Therefore, after the data is collected, the one or more sensors may be triggered to send a synchronization request message, so as to further trigger the time synchronization. In other words, in some embodiments, the time synchronization may be triggered when the sensor has a time synchronization requirement, thereby reducing unnecessary time synchronization, reducing a calculation amount, and the like. At the same time, it can be further ensured that time synchronization is performed before each fusion, to ensure accuracy of each fusion.

In a possible implementation, the determining of the N target sensors from the plurality of sensors includes: determining, from the plurality of sensors based on the M target sensors and a preset fusion rule, N−M target sensors configured to perform data fusion with the M target sensors, where the N−M target sensors belong to the N target sensors.

In some embodiments, after the synchronization request is sent by the one or more sensors (that is, a sensor that has a data fusion requirement) is received, based on the one or more sensors and the preset fusion rule, another sensor configured to perform data fusion with the one or more sensors is determined from the plurality of sensors that are included in the intelligent device. For example, the sensor that sends the synchronization request message is a camera in the intelligent vehicle. It should be noted that the camera has a strong resolution and excellent target classification effect, but cannot perform accurate distance measurement and speed measurement due to a loss of depth information. However, a millimeter wave radar in the intelligent vehicle has a high accuracy in distance measurement and speed measurement accuracy, but is poor in classification effect. The camera and the millimeter wave radar have complementary functions. In this way, it may be determined, based on a data complementary fusion rule, that the millimeter wave radar in the intelligent vehicle may be used to perform data fusion with the camera. Therefore, time synchronization may be performed on the camera and the millimeter wave radar subsequently, to ensure accuracy of data fusion between the camera and the millimeter wave radar. In this way, a more comprehensive road condition analysis and environment sensing are provided for the intelligent vehicle, and driving comfort and safety may be improved.

In a possible implementation, the time synchronization is a relative time synchronization or an absolute time synchronization. When the time synchronization is the relative time synchronization, the first clock is a relative clock. When the time synchronization is the absolute time synchronization, the first clock is an absolute clock.

In some embodiments, when the time synchronization is performed on the plurality of sensors, the time synchronization may be the relative time synchronization, or the absolute time synchronization. When the time synchronization is the relative time synchronization, the obtained reference clock may be a relative clock (for example, a clock inside the intelligent vehicle, where time displayed on the relative clock may be different from actual time, and may also be displayed as a simple $32^{nd}$ minute, a $60^{th}$ minute, or relative time in a form of 1 hour and 1 minute ago, 5 minutes ago, or the like). When the time synchronization is the absolute time synchronization, the obtained reference clock may be an absolute clock, (for example, standard universal time such as Beijing time). Generally, inside the intelligent device, only relative time synchronization of sensors needs to be ensured. However, when external communication needs to be performed, for example, data of the plurality of sensors of the intelligent device is fused or analyzed and compared with data of a plurality of sensors in another intelligent device, absolute time synchronization can be performed to ensure accuracy of data fusion or an analysis ratio.

In a possible implementation, the method may further include: performing data fusion on data respectively collected by the N target sensors.

In some embodiments, for example, in an autonomous driving scenario, accurate and effective fusion processing may be performed on data collected by the plurality of time-synchronized sensors, to obtain more comprehensive and accurate road condition analysis, environment sensing, and the like, and to improve driving comfort and safety. In some possible embodiments, time synchronization may be performed on a plurality of sensors in an intelligent robot, and then data collected by the plurality of time-synchronized sensors is fused, so that the intelligent robot can better sense an environment and perform an operation such as obstacle avoidance. It should be noted that some embodiments may be further used in other scenarios other than the foregoing scenarios. For example, the data collected by the plurality of sensors may be analyzed and compared to detect performance of each sensor, and the like. This is not limited in some embodiments.

According to a second aspect, an embodiment of this application provides a communication apparatus, applied to an intelligent device, where the intelligent device includes a plurality of sensors, and the apparatus includes: a first determining unit (e.g., determining circuit), configured to determine N target sensors from the plurality of sensors, where N is an integer greater than 1: and a correction unit (e.g., correction circuit), configured to correct, based on a first clock, respective second moments of the N target sensors to a first moment of the first clock.

In a possible implementation, the apparatus further includes: a second determining unit (e.g., determining circuit), configured to determine clock frequency offsets between respective clocks of the N target sensors and the first clock and determine respective transmission delays of the N target sensor based on a preset time synchronization protocol: and a time synchronization unit (e.g., time synchronization circuit), configured to perform time synchronization on the N target sensors based on the clock frequency offsets between the respective clocks of the N target sensors and the first clock, and the respective transmission delays of the N target sensors.

In a possible implementation, the apparatus further includes: a first obtaining unit (e.g., obtaining circuit), configured to obtain current status information of the intelligent device, where the status information includes at least one of speed information, direction information, and scenario information: and a third determining unit (e.g., determining circuit), configured to determine the preset time synchronization protocol based on the status information, where the preset time synchronization protocol belongs to a time synchronization protocol set, and the time synchronization protocol set includes at least one of a gPTP, a NTP, a TPSN, and RBS.

In a possible implementation, the apparatus further includes: a second obtaining unit (e.g., obtaining circuit), configured to obtain the first clock based on a preset time synchronization cycle.

In a possible implementation, the apparatus further includes: a receiving unit (e.g., receiving circuit), configured to receive synchronization request messages respectively sent by M target sensors in the plurality of sensors, where the synchronization request messages are messages sent after the M target sensors collect data at the respective second moments, the M target sensors belong to the N target sensors, and M is an integer greater than or equal to 1: and a third obtaining unit (e.g., obtaining circuit), configured to obtain the first clock based on the synchronization request messages respectively sent by the M target sensors.

In a possible implementation, the first determining unit is configured to: determine, from the plurality of sensors based on the M target sensors and a preset fusion rule, N–M target sensors configured to perform data fusion with the M target sensors, where the N–M target sensors belong to the N target sensors.

In a possible implementation, the time synchronization is a relative time synchronization or an absolute time synchronization; and when the time synchronization is the relative time synchronization, the first clock is a relative clock: or when the time synchronization is the absolute time synchronization, the first clock is an absolute clock.

In a possible implementation, the apparatus further includes: a fusion unit (e.g., fusion circuit), configured to perform data fusion on data respectively collected by the N target sensors.

According to a third aspect, this application provides a communication apparatus. The apparatus includes a processor, and the processor is configured to support the communication apparatus in implementing a corresponding function in the communication method provided in the first aspect. The communication apparatus may further include a memory: The memory is configured to be coupled to the processor, and stores program instructions and/or data. The apparatus may further include a communication interface, configured to communicate between the apparatus and another device or a communication network.

According to a fourth aspect, an embodiment of this application provides a computer-readable storage medium. The computer-readable storage medium stores a computer program, and the computer program is executed by the processor to implement the communication method according to any implementation of the first aspect.

According to a fifth aspect, an embodiment of this application provides for a computer program. The computer program includes instructions. When the instructions are executed by a computer, the computer can perform the communication method according to any implementation of the first aspect.

According to a sixth aspect, an embodiment of this application provides a chip system. The chip system includes the communication apparatus according to any implementation of the second aspect, and is configured to implement functions in the communication method according to any implementation of the first aspect. In a possible design, the chip system further includes a memory. The memory is configured to store program instructions and/or data. The chip system may include a chip, or may include a chip and another discrete component.

According to a seventh aspect, an embodiment of this application provides a communication system, including at least one of the communication apparatus according to any implementation of the second aspect, the communication apparatus according to the third aspect, or the chip system according to the sixth aspect, and a plurality of sensors.

DESCRIPTION OF EMBODIMENTS

Figure 1A:
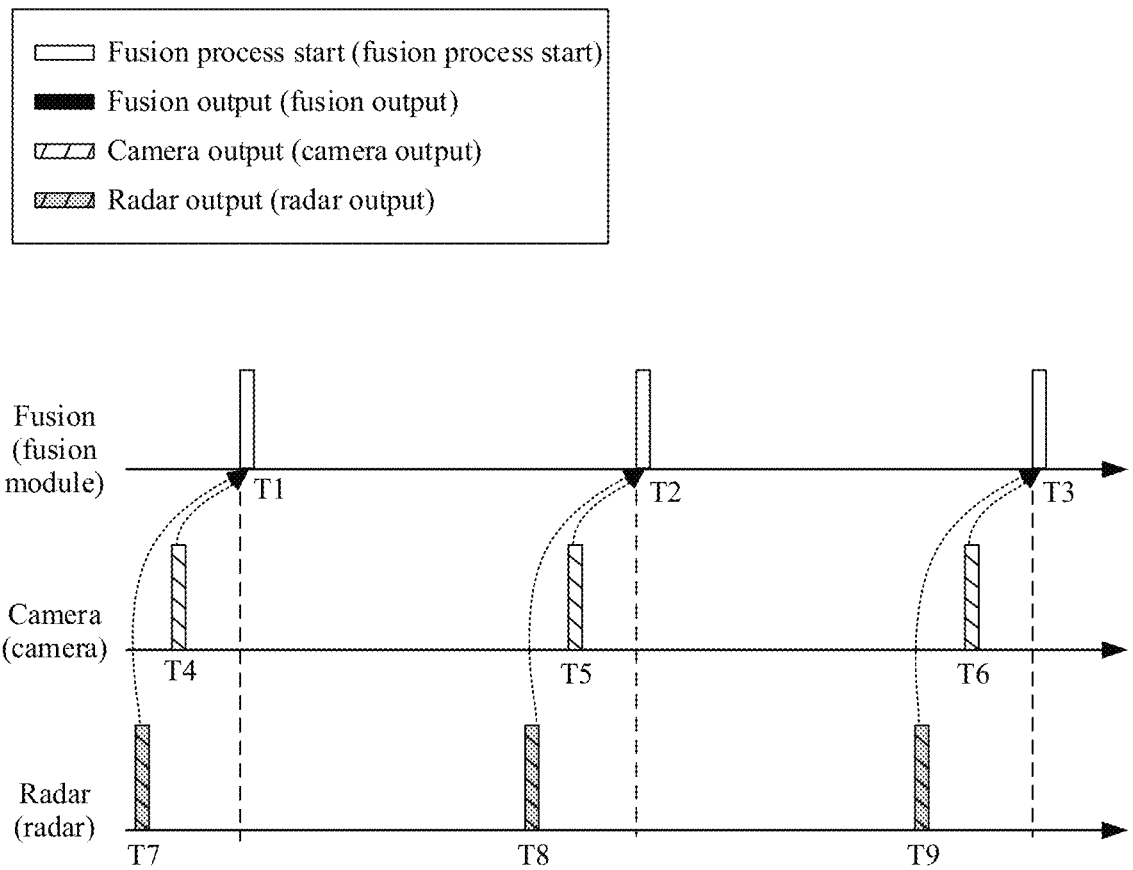
FIG. 1a is a schematic diagram of data fusion according to an embodiment.

The following description describes embodiments of this application with reference to the accompanying drawings of the embodiments of this application.

In the specification, claims, and accompanying drawings of this application, the terms "first", "second", "third", "fourth" and so on are intended to distinguish between different objects, but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It may be understood that, when no conflict occurs, embodiments described in this specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a processor and/or an execution thread, and a component may be located on one computer and/or distributed between two or more computers. In addition, these components may be executed from various computer-readable media that store various data. For example, the components may communicate by using a local and/or remote process and based on, for example, a signal having one or more data packets (for example, data from two components interacting with another component in a local system, a distributed system, and/or across a network such as the Internet interacting with other systems by using the signal).

Some terms in this application are first described, so as to help persons skilled in the art have a better understanding.

(1) Time synchronization is a process of providing a unified time scale for a distributed system by performing specific operations on a local clock. In a centralized system, all processes or modules can obtain a time from a unique global clock of the system. Therefore, any two events in the system have a clear sequence. In a distributed system, due to physical dispersion, the system cannot provide a unified global clock for independent modules, and each process or module maintains its own local clock. Therefore, even if all local clocks are calibrated at a specific moment, these local clocks are inconsistent after a period of time due to inconsistent timing rates and operation environments of these local clocks. Time synchronization needs to be performed in this scenario, so that the local clocks can be recalibrated to a same time value. Generally, synchronization of clocks in the system does not require all clocks to be completely aligned with a standard clock of the system. It is only required to know a clock difference between each clock and the standard clock of the system at a comparative moment, and a drift correction parameter of the clock difference may be obtained through comparing the time difference relative to the standard clock of the system. Therefore, clock adjustment is not required. In some embodiments, time synchronization may be performed on clocks of a plurality of sensors in an intelligent device based on the obtained first clock (which may be the standard clock of the system), and time of each sensor is corrected based on an existing offset.

(2) A generalized precision time protocol (gPTP) is a standard used to ensure time synchronization between terminals that receive and transmit data, and may achieve nanosecond-level synchronization precision. Because clocks of nodes operate independently of each other, and some applications require the clocks of the nodes to be executed in step, the gPTP is used to synchronize clocks of nodes in an in-vehicle network. For example, tasks of playing audio and video may be implemented on different nodes. Therefore, these two devices should have a same clock reference. If the two devices do not have a same clock reference, a displayed image may not match the audio.

(3) A network time protocol (NTP) is a protocol used for network time synchronization based on a user datagram protocol (UDP), so that a clock of a terminal device in a network is synchronized to a coordinated universal time (UTC), and a precise synchronization and a time checking function can be implemented in cooperation with offset adjustments to each time zone. A time synchronization function provided by an NTP server enables a clock system of the device to run normally, so as to meet a time synchronization requirement of a fusion system.

To facilitate an understanding of embodiments of this application, and further analyze and provide the technical problems that are to be resolved by embodiments of this application, the following, for example, lists a solution of a multi-sensor data fusion technology.

A plurality of pieces of data are aligned to a same time of the fusion module based on time information of data respectively collected by the plurality of sensors, to perform fusion processing on the plurality of pieces of data.

First, it should be noted that, for example, in a field such as autonomous driving of an intelligent vehicle, a prerequisite for fusion of data of a plurality of sensors in the intelligent vehicle is that the data of the plurality of sensors is data that is collected by the plurality of sensors for a same scenario. If the data of the plurality of sensors is not the data collected by the plurality of sensors for the same scenario, effective fusion cannot be performed. An important criteria for determining whether the data collected by the plurality of sensors is for the same scenario is time information of the data. For example, the time information may be a moment at which data collection is completed, or a moment at which the sensors output the data. It is assumed that, in an ideal case, the plurality of sensors in the intelligent vehicle collect data at a same frequency, and the plurality of sensors begin to collect data for a same scenario at the same time, and complete the collection at the same time. After the collection is completed, the plurality of sensors may add corresponding time information (for example, a corresponding timestamp is added based on a moment at which data collection is completed) to the data collected by the plurality of sensors based on their respective clocks. In the ideal case, moments at which the plurality of sensors respectively collect the data are the same. After receiving the data collected by the plurality of sensors, the fusion module determines, based on the same moments of the data, that the data meets the prerequisites for performing data fusion. Then, the data collected by the plurality of sensors may be fused, to provide more comprehensive and accurate road condition analysis and environment sensing.

It may be understood that, in an actual case, the plurality of sensors in the intelligent vehicle usually cannot perform data collection at the same time, and cannot complete data collection at the same time. In this case, the moments at which the plurality of sensors collect the data are usually not the same. For example. FIG. 1a is a schematic diagram of performing data fusion. As shown in FIG. 1a, two sensors: a camera and a radar are used as an example, where collection frequencies of the camera and the radar, and a fusion frequency of a fusion module are same. As shown in FIG. 1a, the camera collects a target scenario at a moment T4 (the moment T4 is a moment determined based on a local clock of the camera), adds a corresponding timestamp (for example, T4) to the data, and outputs the collected data to the fusion module. As shown in FIG. 1a, the radar collects a target scenario at a moment T7 (the moment T7 is a moment determined based on a local clock of the radar), adds a corresponding timestamp (for example, T7) to the data, and outputs the collected data to the fusion module. T4 is different from T7, and T4 is after T7. As shown in FIG. 1a, when the fusion module performs data fusion at a moment T1 based on a fixed fusion frequency of the fusion module, the fusion module may enable for a plurality of pieces of latest data before the moment T1 to correspond to the moment T1, so that the plurality of pieces of data can be smoothly fused by corresponding the moments of each of the plurality of pieces of latest data to the moment T1. After the fusion is completed, the fusion module may output corresponding fusion target information, so that the intelligent vehicle formulates better path planning and the like. As shown in FIG. 1a. T4 and T7 are the latest moments before T1. In this case, the fusion module may enable data respectively collected by the camera and the radar to correspond to the moment T1 of the fusion module. In other words, data that is originally of different moments is used as data of a same moment, so that the plurality of pieces of data can be fused subsequently. In some possible implementations, data of each sensor is calculated to a same moment on a time axis of the fusion module based on a timestamp of the data collected by each sensor, a transmission delay (the transmission delay is a transmission delay from the sensor to the fusion module) of each sensor, and the like, so as to perform data fusion.

As shown in FIG. 1a, for example, T4 and T7 may be enabled to correspond to T1 through calculation, so that data collected by the camera at the moment T4 and data collected by the radar at the moment T7 is fused at the moment T1. In an example of a fusion method, processing, such as data association (or referred to as target association), and tracking may be performed on the two pieces of data by using a target-level fusion method. Finally, the fusion module may output corresponding fusion target information or the like, and may further predict a road condition or the like. Details are not described herein again. For another example, as shown in FIG. 1a. T5 and T8 may be enabled to correspond to T2 through calculation, so that data collected by the camera at the moment T5 and data collected by the radar at the moment T8 is fused at a moment T2. For another example, T6 and T9 may be enabled to correspond to T3 through calculation, so that data collected by the camera at the moment T6 and the data collected by the radar at the moment T9 is fused at the moment T3. Details are not described herein again.

Figure 1B:
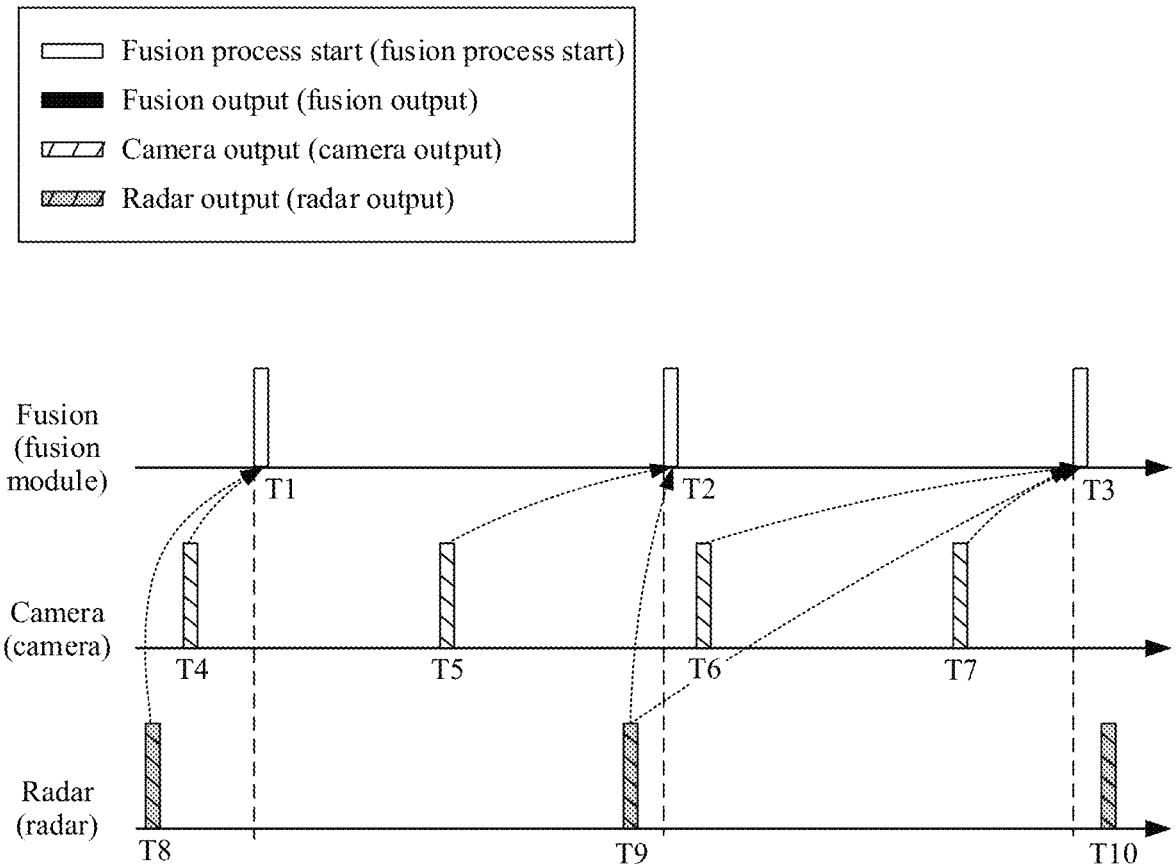
FIG. 1b is another schematic diagram of data fusion according to an embodiment.

In addition, in an actual case, collection frequencies of the sensors in the intelligent vehicle may be different. FIG. 1b is another schematic diagram of data fusion. As shown in FIG. 1b, two sensors: a camera and a radar are used as an example, where collection frequencies of the camera and the radar, and a fusion frequency of a fusion module are different. Therefore, as described above, data of each sensor may be calculated to a same moment on a time axis of the fusion module based on a timestamp of the data collected by each sensor, a transmission delay (the transmission delay is a transmission delay from the sensor to the fusion module) of each sensor, and specific time compensation (for example, respective cycles of the fusion module, the camera and the radar may be considered, and so on, and details are not described herein), so as to perform data fusion. As shown in FIG. 1b, for example, T4 and T8 may be enabled to correspond to T1 through calculation, so that data collected by the camera at the moment T4 and data collected by the radar at the moment T8 is fused at the moment T1. For another example, T5 and T9 may be enabled to correspond to T2 through calculation, so that data collected by the camera at the moment T5 and data collected by the radar at the moment T9 is fused at the moment T2. For another example, T6, T7, and T9 may be enabled to correspond to T3 through calculation, so that data collected by the camera at the moments T6 and T7 and data collected by the radar at the moment T9 is fused at the moment T3; or T7, which is closest to T3, is selected, and T7 is enabled to correspond to T3 through calculation, so that data collected by the camera at the moment T7 and data collected by the radar at the moment T9 is fused at the moment T3, and so on. Details are not described herein.

Disadvantages of this solution are as follows.

As described above, when data of different sensors is fused, the time information is usually reference information for data fusion. Both data fusion in the ideal case and data fusion in the actual case are performed based on a timestamp added, based on a local clock, by each sensor to the data collected by the sensor, where in the actual case, time alignment needs to be performed on data of each sensor, to implement data association on the data collected by each sensor, so as to ensure accurate and smooth data fusion. In this way, when local clocks of the plurality of sensors are different, different sensors collect data and record time based on different clocks. Therefore, data originally collected at a same moment have different moments on different sensors, and therefore data fusion cannot be accurately performed. Alternatively, in a case in which local clocks of the sensors are different, and there is a specific delay when the different sensors output data, a case that the fusion module cannot accurately enable the data collected by each sensor to correspond to the same moment on the time axis of the fusion module is likely to occur. For example, because the local clock of the sensor is 300 ms faster, a timestamp added to the data that can be originally aligned to a same moment is 300 ms faster, and finally the data and data of another sensor cannot be aligned to the same moment. This greatly affects data association and subsequent fusion processing of the fusion module. For example, the data collected by the plurality of sensors cannot be fused or is incorrectly fused, consequently the intelligent vehicle is enabled to generate a target false alarm and may perform unnecessary automatic emergency braking, and the like, and reduces driving safety.

Figure 1C:
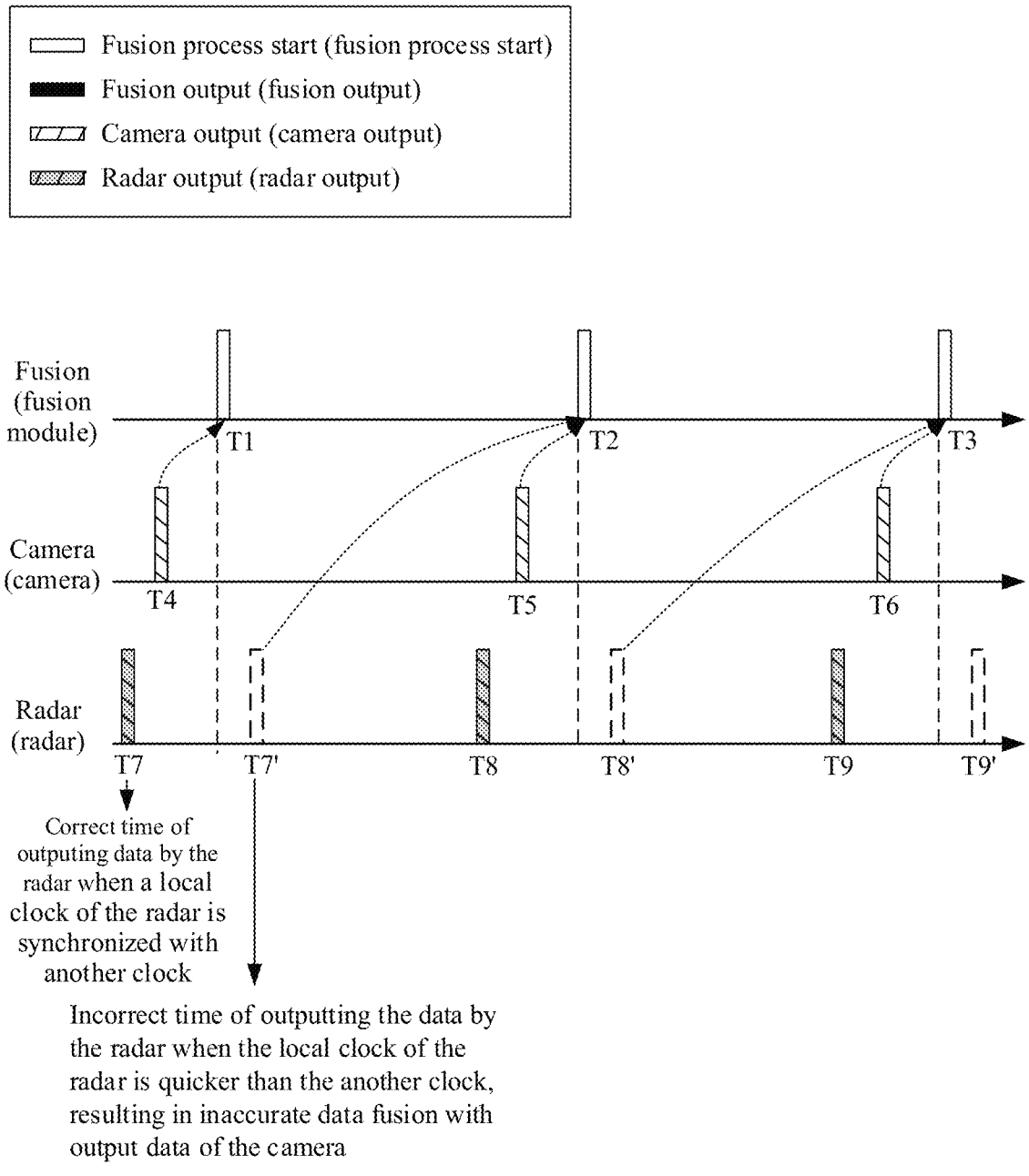
FIG. 1c is still another schematic diagram of data fusion according to embodiment.

FIG. 1c is still another schematic diagram of data fusion. As shown in FIG. 1c, because a local clock of a radar is fast (relative to the other sensors), a timestamp of data originally collected at a moment T7 is a moment T7'. In this case, a fusion module cannot accurately use the data with the timestamp of T7' when selecting the previous latest data to perform data fusion at the moment T1. During a next fusion, namely at a moment T2, the fusion module may fuse the data with the timestamp of T7' and data collected by a camera at a moment T5, which causes poor fusion effect. Alternatively, a target association cannot be performed because of an excessively great difference between the two pieces of data. This may cause an intelligent vehicle to have a target false alarm, and a related intelligent driving function fault, for example, an accidental trigger of unnecessary automatic emergency braking (AEB), and reduces driving safety.

In conclusion, a plurality of sensors in the solution have respective local clocks, and time of the plurality of sensors is asynchronous, which cannot meet a requirement of high data fusion accuracy. Therefore, to resolve a problem that an actual service requirement cannot be met in a multi-sensor data processing technology; technical problems to be resolved in this application includes the following aspects: implementing time synchronization between the plurality of sensors, and ensuring accuracy of data fusion between the plurality of sensors. In addition, a multi-sensor fusion architecture has a plurality of forms, including a distributed architecture, a centralized architecture, and the like. In different multi-sensor fusion architectures, different deployments of a controller, a sensor, and a fusion module lead to different requirements for time synchronization. Different scenarios have different requirements for time synchronization precision. For example, a scenario such as a curve and a U-shaped curve or turn have high requirements on time synchronization. This application further provides a flexible time synchronization method for multi-sensor fusion, so that time synchronization can be performed for various sensor configurations and transmission methods in a flexible architecture, to meet different fusion architecture requirements and meet different scenario requirements.

Figure 2A:
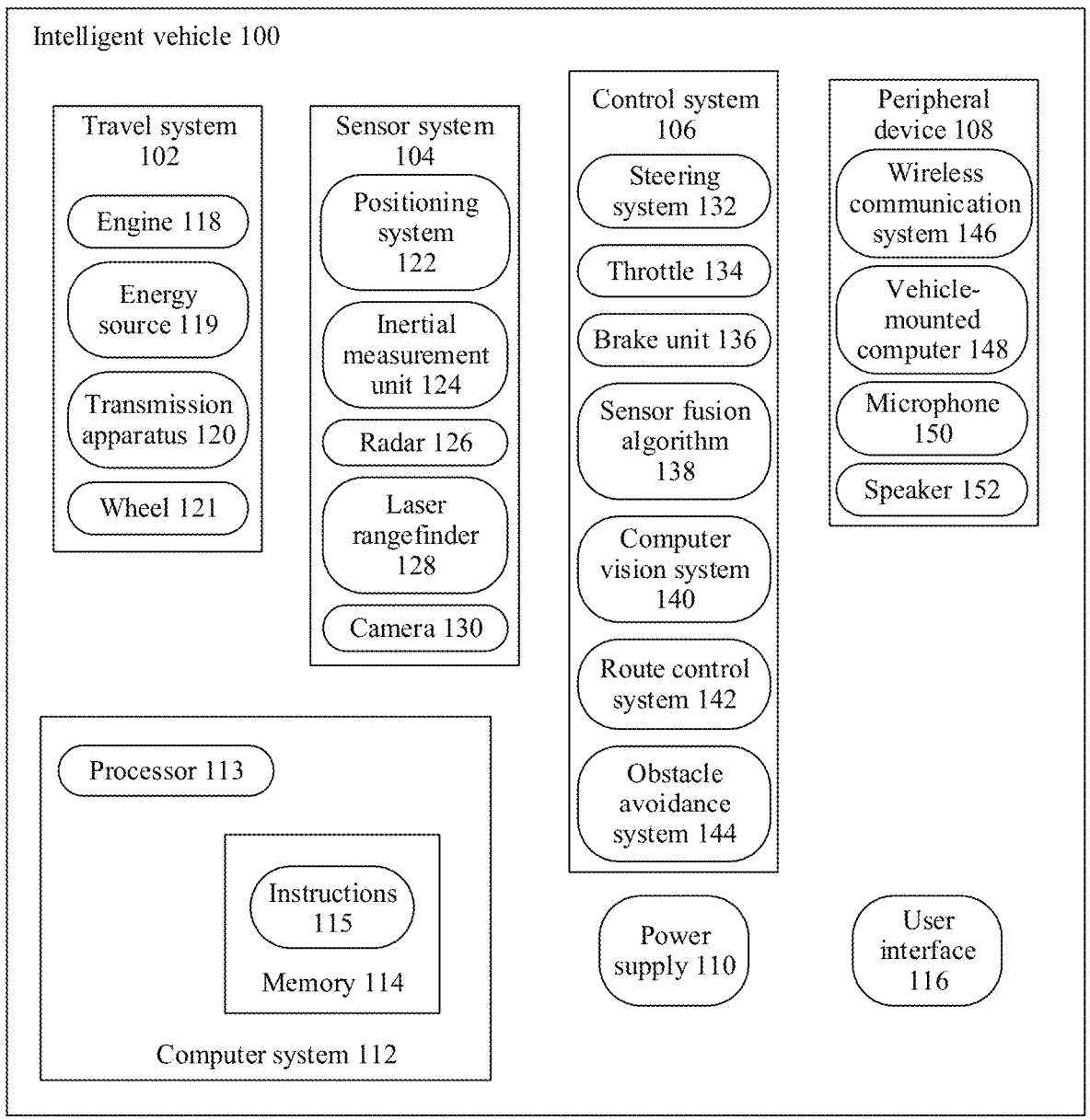
FIG. 2a is a functional block diagram of an intelligent vehicle according to an embodiment of this application.

FIG. 2a is a functional block diagram of an intelligent vehicle according to an embodiment of this application. A communication method provided in some embodiments may be applied to an intelligent vehicle 100 shown in FIG. 2a. In an embodiment, the intelligent vehicle 100 may be configured to be completely or partially in an autonomous driving mode. When the intelligent vehicle 100 is in the autonomous driving mode, the intelligent vehicle 100 may be set to operate without user involvement.

The intelligent vehicle 100 may include various systems, for example, a travel system 102, a sensor system 104, a control system 106, one or more peripheral devices 108, a power supply 110, a computer system 112, and a user interface 116. Optionally; the intelligent vehicle 100 may include more or fewer systems, and each system may include one or more elements. In addition, each system and element of the intelligent vehicle 100 may be interconnected in a wired or wireless manner.

The travel system 102 may include components that provide power to the intelligent vehicle 100. In an embodiment, the travel system 102 may include an engine 118, an energy source 119, a transmission apparatus 120, and a wheel 121. The engine 118 may be an internal combustion engine, an electric motor, an air compression engine, or another type of engine combination, for example, a hybrid engine including a gas-oil engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, or other power sources. The energy source 119 may also provide energy to another system of the intelligent vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that can sense information about an ambient environment of the intelligent vehicle 100. For example, the sensor system 104 may include a positioning system 122 (the positioning system may be a global positioning system (GPS), or may be a BeiDou system or another positioning system), an inertial measurement unit (IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored intelligent vehicle 100. Sensor data from one or more of these sensors can be used to detect an object and corresponding features (a position, a shape, a direction, a speed, and the like) of the object. This detection and identification are key functions of safety operations of an autonomous driving intelligent vehicle 100.

The positioning system 122 may be configured to estimate a geographical location of the intelligent vehicle 100. The IMU 124 is configured to sense a location and an orientation change of the intelligent vehicle 100 based on inertial acceleration. In an embodiment, the IMU 124 may be a combination of an accelerometer and a gyroscope.

The radar 126 may sense an object in the ambient environment of the intelligent vehicle 100 by using a radio signal. In some embodiments, in addition to sensing an object, the radar 126 may further be configured to sense a speed and/or a moving direction of the object.

The laser rangefinder 128 may sense, by using a laser, an object in an environment in which the intelligent vehicle 100 is located. In some embodiments, the laser rangefinder 128 may include one or more laser sources, a laser scanner, one or more detectors, and another system component.

The camera 130 may be configured to capture a plurality of images of the ambient environment of the intelligent vehicle 100. The camera 130 may be a static camera or a video camera.

In some possible embodiments, the sensor system 104 may further include a component configured to perform data fusion on data collected by a plurality of sensors in the sensor system 104, to output more comprehensive and accurate data for autonomous driving of the intelligent vehicle 100.

The control system 106 controls operations of the intelligent vehicle 100 and components of the intelligent vehicle 100. The control system 106 may include various elements, including a steering system 132, a throttle 134, a brake unit 136 (e.g., brake circuit, brake module), a sensor fusion algorithm 138, a computer vision system 140, a route control system 142, and an obstacle avoidance system 144.

The steering system 132 may be operated to adjust a moving direction of the intelligent vehicle 100. For example, in an embodiment, the steering system 132 may be a steering wheel system.

The throttle 134 is configured to control an operating speed of the engine 118 and further control a speed of the intelligent vehicle 100.

The brake unit 136 is configured to control the intelligent vehicle 100 to decelerate. The brake unit 136 may use friction to slow down the wheel 121. In another embodiment, the brake unit 136 may convert kinetic energy of the wheel 121 into an electric current. The brake unit 136 may alternatively use other forms to reduce a rotation speed of the wheel 121, to control the speed of the intelligent vehicle 100.

The computer vision system 140 may operate to process and analyze an image captured by the camera 130, to identify an object and/or a feature in the ambient environment of the intelligent vehicle 100. The object and/or the feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of the object, and the like.

The route control system 142 is configured to determine a travel route of the intelligent vehicle 100. In some embodiments, the route control system 142 may combine data from the sensor system 104 and one or more predetermined maps to determine a travel route for intelligent vehicle 100.

The obstacle avoidance system 144 is configured to: identify, evaluate, and avoid or bypass a potential obstacle in the environment of the vehicle 100.

Certainly, in an example, the control system 106 may add or alternatively include components other than those shown and described. Alternatively, the control system 106 may not include some of the components shown above. In some possible embodiments, the control system 106 may further include a component configured to perform time synchronization on a plurality of sensors in the sensor system 104.

The intelligent vehicle 100 may interact with an external sensor, another vehicle, another computer system, and/or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the intelligent vehicle 100 to interact with the user interface 116. For example, the vehicle-mounted computer 148 may provide information for the user of the intelligent vehicle 100. The user interface 116 may further operate the vehicle-mounted computer 148 to receive a user input. The vehicle-mounted computer 148 may perform operations through a touchscreen. In another case, the peripheral device 108 may provide a means for the intelligent vehicle 100 to communicate with another device located in the intelligent vehicle. For example, the microphone 150 may receive audio (for example, a voice command or another audio input) from the user of the intelligent vehicle 100. Likewise, the speaker 152 may output audio to the user of the intelligent vehicle 100.

The wireless communication system 146 may wirelessly communicate with one or more devices directly or through a communication network. For example, the wireless communication system 146 may use a third generation (3G) cellular communication such as code-division multiple access (CDMA), evolution-data optimized (EVDO), or global system for mobile communication (GSM)/general packet radio service (GPRS), fourth generation (4G) cellular communication such as long-term evolution (LTE), or fifth generation (5G) cellular communication, or another cellular communication. The wireless communication system 146 may communicate with a wireless local area network (WLAN) through Wi-Fi. In some embodiments, the wireless communication system 146 may directly communicate with a device by using an infrared link, Bluetooth, or ZigBee. Other wireless protocols, for example, various vehicle communication systems, such as the wireless communication system 146, may include one or more dedicated short-range communication (DSRC) devices, and these devices may include public and/or private data communication between the vehicle and/or roadside stations.

The power supply 110 may provide power to various components of the intelligent vehicle 100. In an embodiment, the power supply 110 may be a rechargeable lithium-ion or lead-acid battery: One or more battery packs of such a battery may be configured as a power supply to supply power to the various components of the intelligent vehicle 100. In some embodiments, the power supply 110 and the energy source 119 may be implemented together, for example, in some pure electric vehicles.

Some or all of functions of the intelligent vehicle 100 are controlled by the computer system 112. The computer system 112 may include at least one processor 113, and the processor 113 executes instructions 115 stored in a non-transient computer-readable medium such as the memory 114. The computer system 112 may alternatively be a plurality of computing devices that control an individual component or a subsystem of the intelligent vehicle 100 in a distributed manner.

The processor 113 may be any conventional processor, such as a commercially available central processing unit (CPU). Optionally, the processor may be a dedicated device such as an application-specific integrated circuit (ASIC) or another hardware-based processor. Although FIG. 2a functionally illustrates other elements of the processor, the memory, and the computer system 112 in a same block, persons of ordinary skill in the art should understand that the processor, the computer, or the memory may actually include a plurality of processors, computers, or memories that may or may not be stored in a same physical housing. For example, the memory may be a hard disk drive or another storage medium. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be disposed outside of the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 114 may include the instructions 115 (for example, program logic), and the instructions 115 may be executed by the processor 113 to perform various functions of the intelligent vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, and a location, a direction, a speed, and other such vehicle data of the vehicle, and other information. Such information may be used by the intelligent vehicle 100 and the computer system 112 during operation of the intelligent vehicle 100 in an autonomous, semi-autonomous, and/or manual mode.

The user interface 116 is used to provide information for or receive information from the user of the intelligent vehicle 100. Optionally, the user interface 116 may include one or more input/output devices in a set of peripheral devices 108, for example, the wireless communication system 146, the vehicle-mounted computer 148, the microphone 150, and the speaker 152.

The computer system 112 may control functions of the intelligent vehicle 100 based on inputs received from various systems (for example, the travel system 102, the sensor system 104, and the control system 106) and from the user interface 116. For example, the computer system 112 may use the input from the control system 106 to control the steering system 132 to avoid an obstacle detected by the sensor system 104 and the obstacle avoidance system 144. In some embodiments, the computer system 112 may operate to provide control on the intelligent vehicle 100 and the systems of the intelligent vehicle 100 in many aspects.

Optionally, the computer system 112 may further receive information from another computer system, or transfer information to another computer system. For example, the computer system 112 may transfer sensor data collected from the sensor system 104 of the intelligent vehicle 100 to another remote computer system and submit the data to the another computer system for processing. For example, the data collected by various sensors in the sensor system 104 is fused by the other computer system. Then, data or an analysis result obtained after the fusion is returned to the computer system 112. Optionally, data from the computer system 112 may be transmitted to a computer system on a cloud side by using a network for further processing. The network and an intermediate node may include various configurations and protocols, including Internet, World Wide Web (WWW), an intranet, a virtual private network (WPN), a wide area network (WAN), a local area network (LAN), a dedicated network using a proprietary communication protocol of one or more companies, Ethernet, Wi-Fi, Hypertext Transfer Protocol (HTTP), and various combinations thereof. Such communication may be performed by any device that can transmit data to and from other computers, such as a modem or a wireless interface.

As described above, in some possible embodiments, the remote computer system interacting with the computer system 112 in the intelligent vehicle 100 may include a server having a plurality of computers, such as a load balancing server cluster, and exchanges information with different nodes of the network for the purpose of receiving, processing, and transmitting data from the computer system 112. The server may have a processor, a memory, instructions, data, and the like. For example, in some embodiments of this application, the data of the server may include providing weather-related information. For example, the server may receive, monitor, store, update, and transmit various pieces of weather-related information. The information may include, for example, rainfall, cloud, and/or temperature information in a form of a report, radar information, a forecast, or the like. The data of the server may further include high-definition (HD) map data and traffic information of a road section in front (for example, real-time traffic congestion, and occurrence of a traffic accident). The server may send the high-definition map data, traffic information, and the like to the computer system 112, so as to assist the intelligent vehicle 100 in performing improved autonomous driving and improve driving safety.

Optionally, one or more of these systems may be separately installed or associated with the intelligent vehicle 100. For example, the memory 114 may be partially or completely separated from the vehicle 100. The foregoing components may be communicatively coupled together in a wired and/or wireless manner.

Optionally, the foregoing systems are merely examples. In actual application, the foregoing systems may be added or deleted based on an actual requirement. FIG. 2*a* should not be understood as a limitation on embodiments of this application.

An autonomous driving vehicle traveling on a road, for example, the intelligent vehicle 100, may recognize an object in an ambient environment of the autonomous driving vehicle, to determine whether to adjust a current speed. The object may be another vehicle, a traffic control device (for example, a traffic signal indicator such as a traffic light), or another type of object. In some examples, each identified object may be considered independently, and based on features of each object, such as a current speed of the object, acceleration of the object, and a spacing between the object and the vehicle, may be used to determine the speed to be adjusted by the autonomous driving vehicle.

Optionally, the autonomous driving intelligent vehicle 100 or a computing device associated with the autonomous driving intelligent vehicle 100 (for example, the computer system 112, the computer vision system 140, or the memory 114 in FIG. 2*a*) may predict behavior of the identified object based on a feature of the identified object and a state of the ambient environment (for example, traffic, rain, and ice on a road). Optionally, each recognized object depends on the actions of each respective object. Therefore, all recognized objects may be considered together to predict an action of a single recognized object. The intelligent vehicle 100 can adjust the speed of the intelligent vehicle 100 based on the predicted behavior of the identified object. In other words, the autonomous driving vehicle can determine, based on the predicted behavior of the object, a stable state in which the vehicle needs to be adjusted (for example, acceleration, deceleration, or stop). In this process, another factor, for example, a transverse location of the intelligent vehicle 100 on a road on which the intelligent vehicle 100 travels, a curvature of the road, or proximity between static and dynamic objects may also be considered, to determine the speed of the intelligent vehicle 100.

In addition to providing instructions for adjusting the speed of the autonomous driving vehicle, the computing device may further provide instructions for correcting a steering angle of the intelligent vehicle 100, so that the autonomous driving vehicle follows a given trajectory and/or maintains safe horizontal and vertical distances between the autonomous driving vehicle and an object (for example, a car in an adjacent lane on the road) near the autonomous driving vehicle.

The intelligent vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited to some embodiments.

Figure 2B:
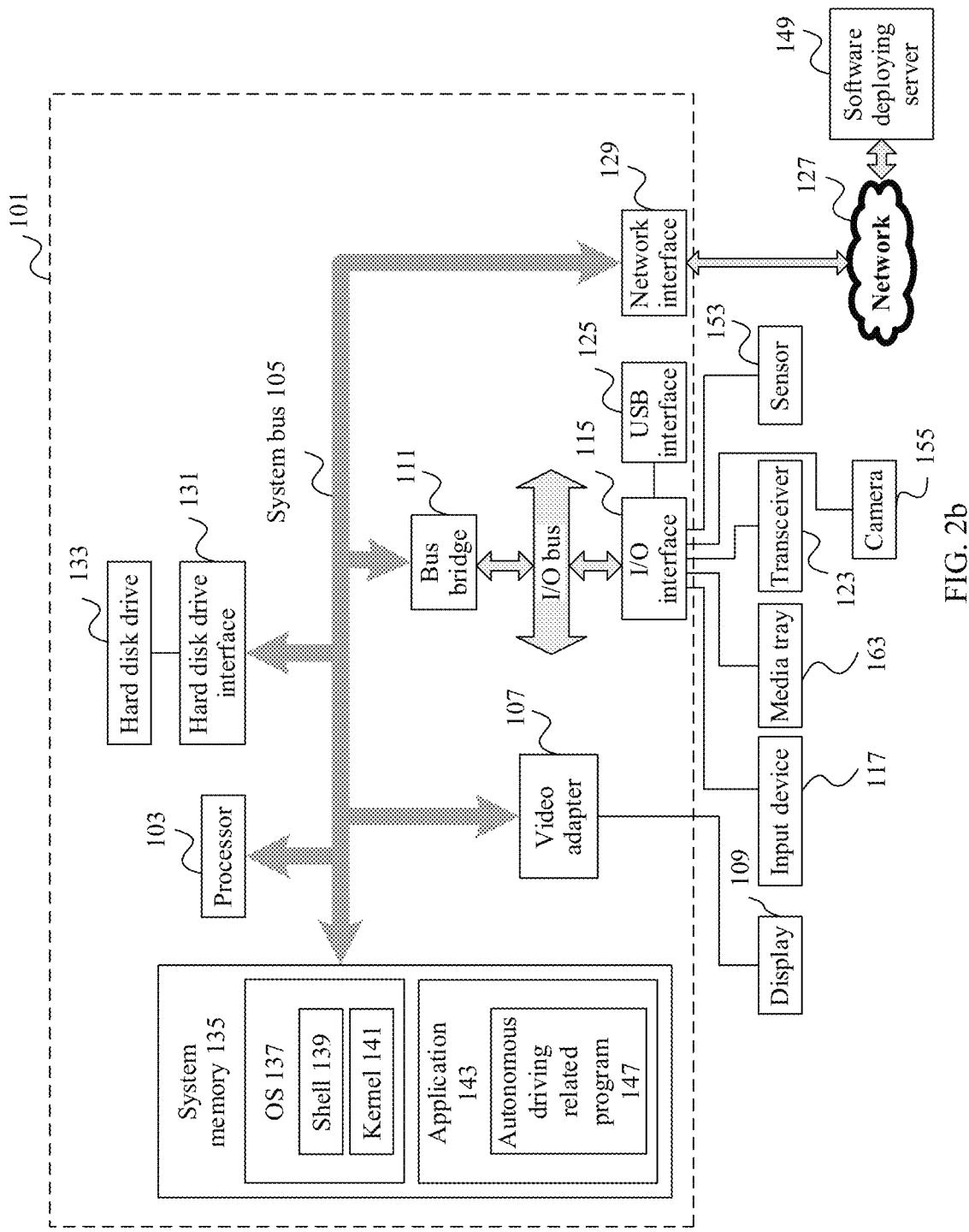
FIG. 2b is a schematic diagram of a structure of a computer system according to an embodiment of this application.

FIG. 2*b* is a schematic diagram of a structure of a computer system according to an embodiment of this application. The computer system 101 may be the computer system 112 in the intelligent vehicle 100 shown in FIG. 2*a*. As shown in FIG. 2*b*, the computer system 101 includes a processor 103, and the processor 103 is coupled to a system bus 105. The processor 103 may be one or more processors, and each processor may include one or more processor cores. As shown in FIG. 2*b*, the computer system 101 may further include a video adapter 107. The video adapter may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 may communicate with a plurality of I/O devices, such as an input device 117 (for example, a keyboard, a mouse, or a touchscreen), or a media tray 163 (for example, a CD-ROM or a multimedia interface). As shown in FIG. 2*b*, the computer system 101 may further include a transceiver 123 (which may send and/or receive a radio communication signal), a camera 155 (which may capture static and dynamic digital video images), and an external universal serial bus ( ) interface 125. Optionally, an interface connected to the I/O interface 115 may be a USB interface.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural-network processor or a combination of the neural-network processor and the foregoing conventional processor.

Optionally, in various embodiments described in this application, the computer system 101 may be disposed outside of the autonomous driving intelligent vehicle 100, and may wirelessly communicate with the autonomous driving intelligent vehicle 100. In other aspect, some of the processes described in this application are performed on a processor disposed inside an autonomous driving vehicle, and others are performed by a remote processor, including actions required to perform a single operation.

The computer system 101 may communicate with a software deploying server 149 through a network interface 129. The network interface 129 is a hardware network interface, for example, a network interface card. A network 127 may be an external network such as the Internet, or an internal network such as the Ethernet or a virtual private network (VPN). Optionally, the network 127 may alternatively be a wireless network such as a Wi-Fi network or a cellular network.

A hard disk drive interface is coupled to the system bus 105. A hardware drive interface is connected to the hard disk drive. A system memory 135 is coupled to the system bus 105. Data running in the system memory 135 may include an operating system 137 and an application 143 of the computer 101.

The operating system includes a shell 139 and a kernel 141. The shell 139 is an interface between a user and the kernel of the operating system. The shell is the outermost layer of the operating system. The shell manages interaction between the user and the operating system, waits for an input of the user, explains the input of the user to the operating system, and processes various output results of the operating system.

The kernel 141 includes components of the operating system that are configured to manage a memory, a file, a peripheral, and a system resource. When directly interacting with hardware, the kernel of the operating system usually runs (e.g., executes) a process, provides inter-process communication, and provides functions such as CPU time slice management, interrupt, memory management, and I/O management.

The application 143 includes programs for controlling autonomous driving of the vehicle, for example, a program that manages interaction between the autonomous driving vehicle and a road obstacle, a program that controls a route or a speed of the autonomous driving vehicle, a program that controls interaction between the autonomous driving vehicle and another autonomous driving vehicle on a road. The application 143 also exists in a system of the deploying server 149. In one embodiment, when the application 147 needs to be executed, the computer system 101 may download the application 143 from the deploying server 14.

The sensor 153 is associated with the computer system 101. The sensor 153 may include a plurality of sensors, and may be the sensor system 104 shown in FIG. 2a. The sensor 153 is configured to detect an ambient environment of the computer system 101. For example, the sensor 153 may detect an animal, a vehicle, an obstacle, a crosswalk, or a traffic signal indicator. Further, the sensor 153 may further detect an ambient environment of an object such as the animal, the vehicle, the obstacle, the crosswalk, or the traffic signal indicator. For example, the ambient environment of the animal includes, for example, another animal that appears around the animal, a weather condition, and brightness of the ambient environment.

Optionally, if the computer 101 is located in the autonomous driving intelligent vehicle, the sensor 153 may include a camera, an infrared sensor, a chemical detector, a microphone, an inertial measurement unit, a radar, and the like. For details, refer to the sensor system 104 shown in FIG. 2a. Optionally, in some embodiments of this application, an autonomous driving scenario of an intelligent vehicle is used as an example. To obtain more comprehensive road condition analysis and environment sensing, data collected by the plurality of sensors, such as the camera, the infrared sensor, the inertial measurement unit, and the radar, may be fused, to obtain more comprehensive and accurate data and further ensure driving safety.

In addition, optionally, in some embodiments of this application, the application 143 may further include a program used to perform time synchronization on the plurality of sensors. Therefore, accuracy and reliability of data of each sensor on time can be ensured, and a case, such as different times of data collected at the same time on different sensors, can be avoided, so as to improve accuracy of data fusion and further improve driving safety.

Figure 2C:
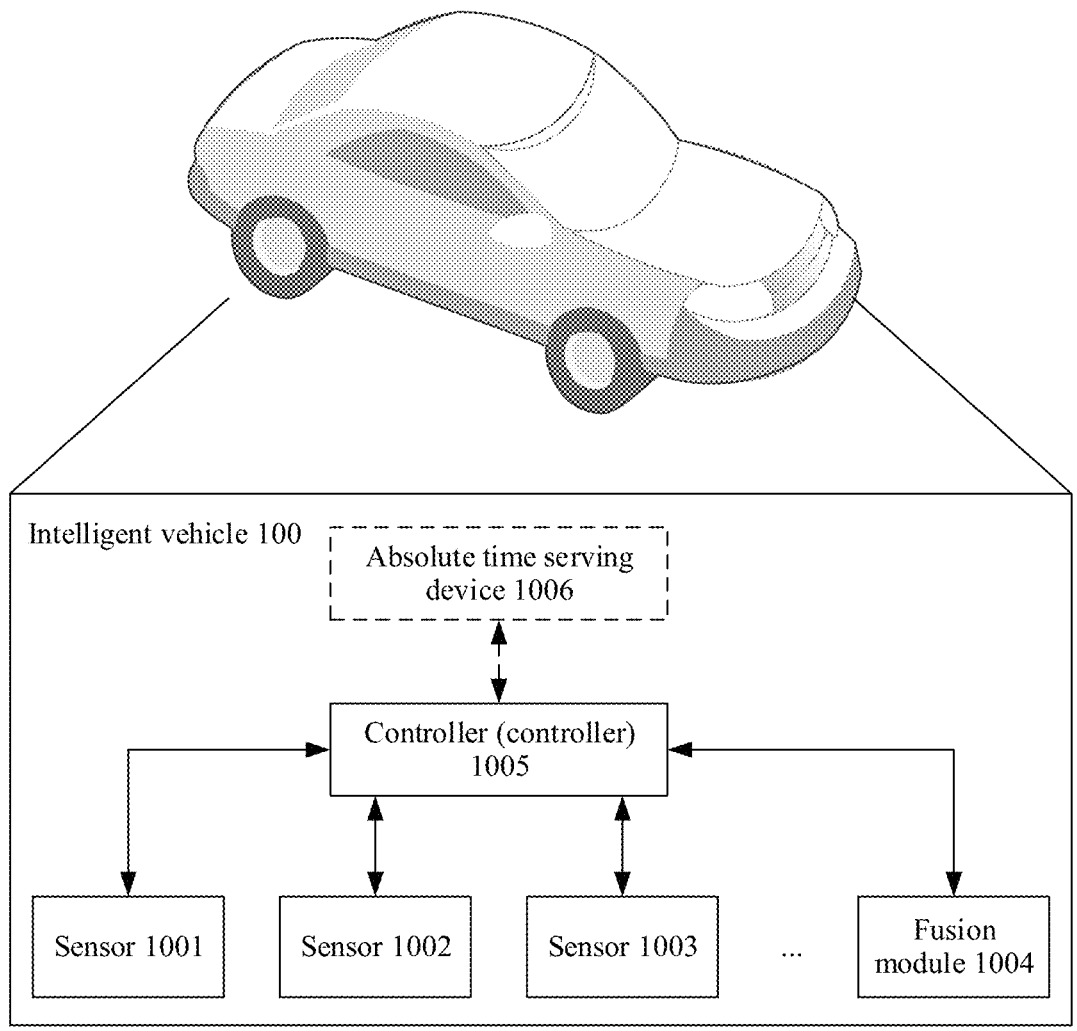
FIG. 2c is a schematic diagram of a system architecture of a communication method according to an embodiment of this application.

FIG. 2c is a schematic diagram of a system architecture of a communication method according to an embodiment of this application. Technical solutions in embodiments of this application may be implemented in the system architecture shown in FIG. 2c or a similar system architecture. As shown in FIG. 2c, the system architecture may include an intelligent vehicle 100, and the intelligent vehicle 100 may include a plurality of sensors, for example, may include sensors 1001, 1002, and 1003 shown in FIG. 2c. The intelligent vehicle 100 may further include a controller 1005, an absolute time serving device 1006, and a fusion module 1004. The controller 1005 may establish communication connections to the sensors 1001, 1002, and 1003 by using a wired or wireless network (for example, Wi-Fi, Bluetooth, and a mobile network), or the like, and perform time synchronization on some or all of the sensors 1001, 1002, and 1003. The controller 1005 may also establish a communication connection to the absolute time serving device 1006 by using a wired or wireless network (for example, Wi-Fi, Bluetooth, and a mobile network), to obtain absolute time information by using the absolute time serving device 1006. It may be understood that some or all of the controller 1005, the absolute time serving device 1006, and the fusion module 1004 may be integrated together. This is not limited to some embodiments.

The following describes in detail the communication method provided in some embodiments by using the sensor 1001 and the sensor 1002 as an example. As shown in FIG. 2c, the user starts the intelligent vehicle 100. If the data respectively collected by the sensor 1001 and the sensor 1002 in the intelligent vehicle 100 needs to be fused, to provide more comprehensive road condition analysis and environment sensing, time synchronization may be performed on the sensor 1001 and the sensor 1002 by using the controller 1005, to ensure accuracy of data fusion. In a first implementation, the controller 1005 may periodically obtain a reference clock (for example, a local clock of the controller 1005) used for time synchronization based on a preset time synchronization cycle (for example, time synchronization is performed every 10 minutes, every 30 minutes, or every hour), and then correct respective second moments of the sensor 1001 and the sensor 1002 to a first moment of the reference clock based on the reference clock. In a second implementation, after collecting data, at least one of the sensor 1001 and the sensor 1002 may send a synchronization request message to the controller 1005 based on a requirement of data fusion and time synchronization. Then, the controller 1005 may trigger a time synchronization procedure based on the received synchronization request message, to obtain a reference clock used for time synchronization. Further, for example, after receiving the synchronization request message sent by the sensor 1001, the controller 1005 may further determine, based on a preset fusion rule, the sensor 1002 that is configured to perform data fusion with the sensor 1001, to perform time synchronization on the sensor 1001 and the sensor 1002, so as to improve accuracy of data fusion between the sensor 1001 and the sensor 1002. Further, in the foregoing two implementations, even if the controller 1005 performs periodic time synchronization as triggered by the time synchronization cycle (for the first implementation), or even if the synchronization request message sent by the sensor 1001 is not received (for the second implementation), the controller 1005 may directly determine, based on an actual fusion requirement, the sensor 1001 and the sensor 1002 on which time synchronization needs to be performed, or the like. This is not limited to some embodiments. After the time synchronization, the fusion module 1004 may perform processing such as fusion on the data collected by the sensor 1001 and the sensor 1002. Alternatively, the controller 1005 may simultaneously perform time synchronization on the fusion module 1004 based on the reference clock, or the like.

As shown in FIG. 2c, a flexible time synchronization system is illustrated in some embodiments. A part of the controller is a master clock (namely, the reference clock used for time synchronization), and each sensor may receive time serving to implement overall time synchronization.

As described above, a communication method between the controller 1005 and the sensors 1001, 1002, and 1003 may be proactive, that is, performing periodic time synchronization, or may be reactive. To be specific, time synchronization is triggered by using the synchronization request message sent by the sensor after the data is collected. A time synchronization protocol specifically used for the time synchronization may be a common related protocol such as gPTP and NTP, and details are not described herein again.

The time synchronization may include absolute time synchronization or relative time synchronization. If the controller 1005 is connected to a GPS, that is, the controller

1005 may be connected to the absolute time serving device 1006 shown in FIG. 2c, absolute time may be provided for the time synchronization, to implement absolute time synchronization. Generally, time synchronization required by a plurality of sensors to perform data fusion is usually relative time synchronization, and can meet requirements such as data association in the data fusion. However, absolute time synchronization is not necessary in a process of data fusion between the plurality of sensors.

As described above, the intelligent vehicle 100 may be a car, a truck, a motorcycle, a bus, a boat, an airplane, a helicopter, a lawn mower, a recreational vehicle (RV), a playground vehicle, a construction device, a trolley, a golf cart, a train, a handcart, or the like that has the foregoing functions. This is not limited to some embodiments. In addition, some embodiments may be further applied to an intelligent device that includes a plurality of sensors in addition to the intelligent vehicle, for example, an intelligent robot. This is not limited to some embodiments. The sensors 1001, 1002, and 1003 may be various sensors having the foregoing function. For example, the sensors 1001, 1002, and 1003 may be a plurality of sensors such as a camera (including a monocular camera, a binocular camera, an infrared camera or the like), a millimeter wave radar, a laser radar, an inertial measurement unit (e.g., inertial measurement circuit), and a vehicle attitude sensor, and may alternatively be the inertial measurement unit 124 and the laser rangefinder 128 shown in FIG. 2a, or the like. This is not limited to some embodiments. The controller 1005 may be a control device having the foregoing time synchronization function, and may be deployed in a vehicle gateway device, or may be an electronic control unit (ECU), a domain controller (MDC), or the like. Optionally, the controller 1005 may be deployed in the control system 106 or the sensor system 104 shown in FIG. 2a, or may be deployed in the computer system 112 shown in FIG. 2a, or the like. This is not limited to some embodiments. As a software module, the fusion module 1004 may be deployed on a separate hardware device, or may be deployed on a single sensor (for example, any one of the sensors 1001, 1002, and 1003 may be deployed in the inertial measurement unit 124 shown in FIG. 2a), or may be deployed in the controller 1005, or the like. This is not limited to some embodiments.

It may be understood that the system architecture of the communication method shown in FIG. 2c is merely an example implementation in embodiments of this application. A system architecture of the communication method in embodiments of this application includes but is not limited to the foregoing system architecture of the communication method, and may also be extended to an architecture and an interface of another fusion unit (e.g., fusion module, fusion circuit) and autonomous driving or assisted driving function, including a multi-layer time synchronization architecture, a distributed time synchronization architecture, a hybrid time synchronization architecture, and the like. This is not limited to some embodiments.

For ease of understanding of embodiments of this application, the following example lists an application scenario to which a communication method in this application is applicable. The following two scenarios may be included.

Scenario 1: Time synchronization is performed on a plurality of sensors in an intelligent robot.

Figure 3:
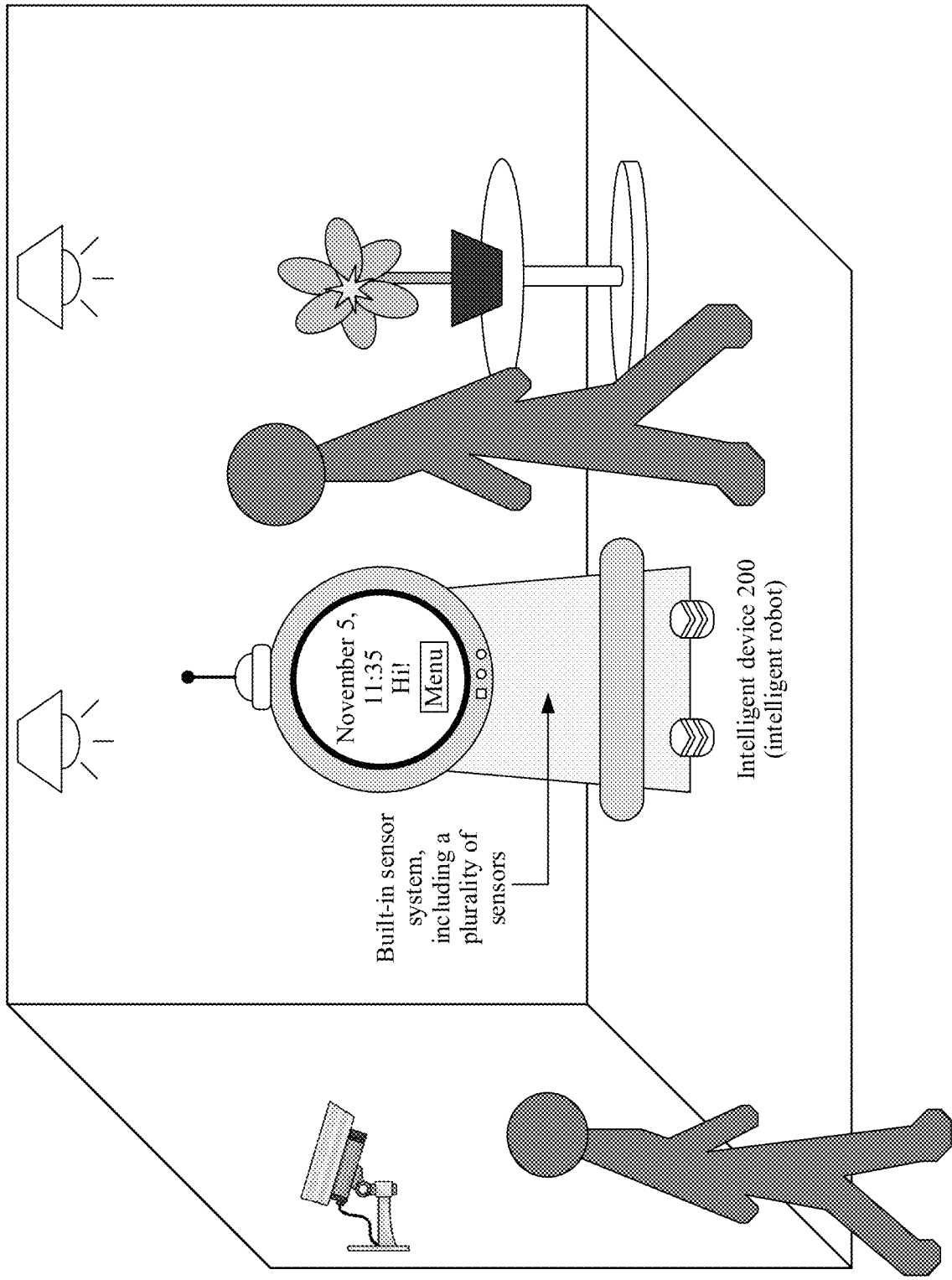
FIG. 3 is a schematic diagram of an application scenario according to an embodiment of this application.

FIG. 3 is a schematic diagram of an application scenario according to an embodiment of this application. As shown in FIG. 3, the application scenario may be an indoor dining room, including an intelligent device 200 (an intelligent robot is used as an example in FIG. 3), a surveillance camera, a table, a plant, and a plurality of guests. Optionally, as shown in FIG. 3, a sensor system may be built in the intelligent device 200, and include a plurality of sensors, for example, may include a camera (such as a monocular camera, a binocular camera or an infrared camera), a millimeter wave radar, and a laser radar. Data collected by the plurality of sensors may be fused, to provide more comprehensive and accurate data for the intelligent device 200, so that the intelligent device 200 can better actively avoid obstacles (for example, the table, the plant, and the guests in the application scenario), perform route planning, provide a service to the guests, and the like. Optionally, the intelligent device 200 may further establish a communication connection to the surveillance camera in the application scenario by using Bluetooth or a wireless network, to obtain data collected by the surveillance camera. In addition, image data collected by the surveillance camera may be further fused with data of the plurality of sensors in the intelligent device 200, to further obtain more comprehensive data, and the like. This is not limited to some embodiments.

In some embodiments, before the intelligent device 200 fuses the data of the plurality of sensors, a controller in the intelligent device 200 may perform, by using the communication method provided in embodiments of this application, time synchronization on the plurality of sensors on which data fusion is performed, to ensure accuracy of the data fusion of the plurality of sensors. In this way, according to the communication method provided in embodiments of this application, emergency braking, incorrect route planning, or even a serious collision, damages to public facilities, and harm to personal safety can be effectively avoided in a scenario when data fusion cannot be accurately performed due to asynchronous time of the plurality of sensors, or data with a large difference between the actual collection moments are incorrectly fused.

As described above, the intelligent device 200 may be the intelligent robot having the foregoing functions shown in FIG. 3, or may be an intelligent vehicle (such as a car, a truck, a motorcycle, a bus, a boat, an airplane, a helicopter, a lawn mower, a recreational vehicle, a playground vehicle, a construction device, a trolley, a golf cart, a train, or a handcart) or another device including a plurality of sensors. Optionally, the intelligent device 200 may further establish a connection to a remote server, so that the server provides computing functions such as data fusion processing and subsequent route planning. The server may be a server having the foregoing functions, or may be a server cluster including a plurality of servers, a cloud computing service center, or the like. This is not limited to some embodiments.

Scenario 2: Time synchronization is performed on a plurality of sensors in an intelligent vehicle.

Figure 4A:
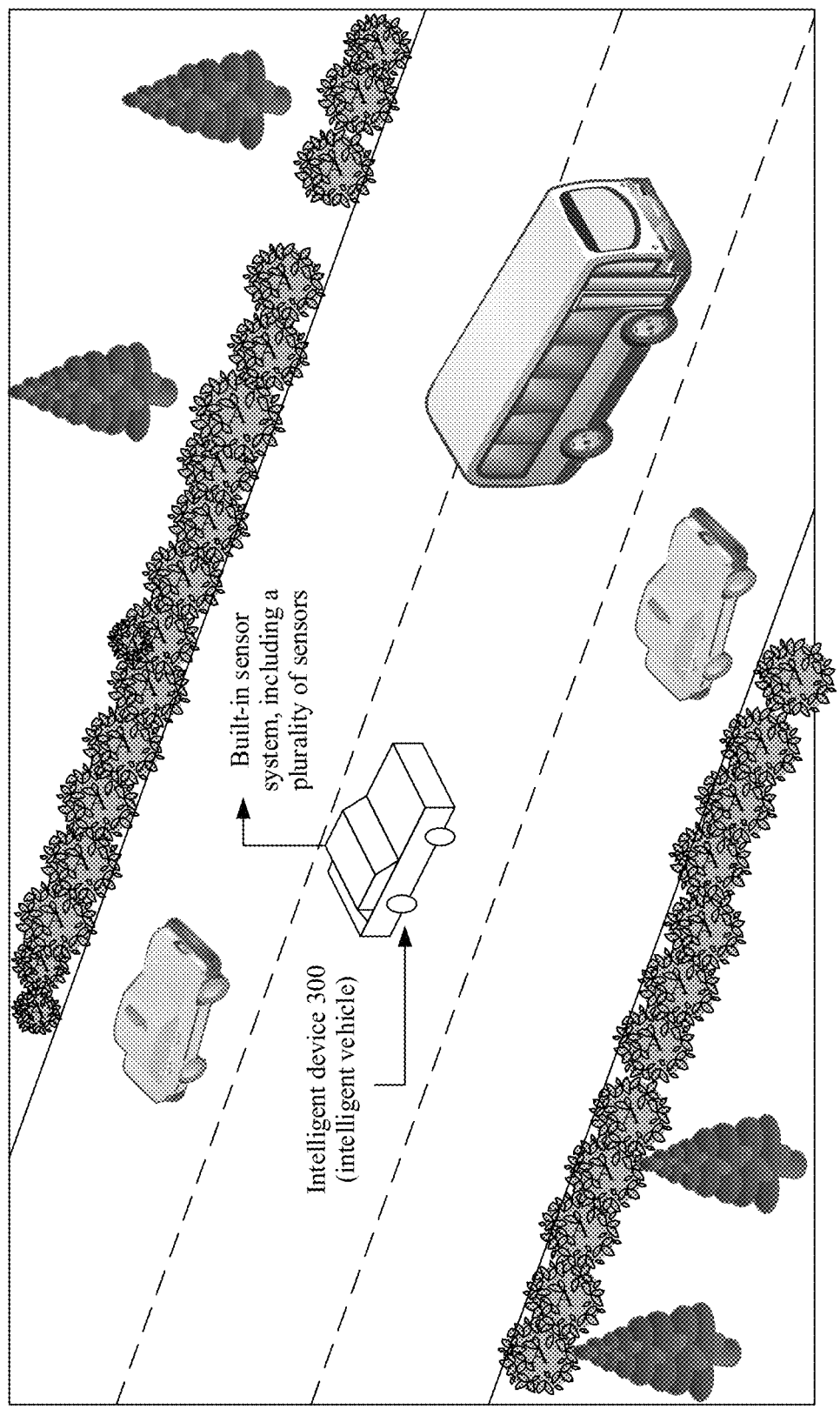
FIG. 4a is a schematic diagram of another application scenario according to an embodiment of this application.

FIG. 4a is a schematic diagram of another application scenario according to an embodiment of this application. As shown in FIG. 4a, the application scenario may be a multi-lane road surface, including an intelligent device 300 (an intelligent vehicle with an autonomous driving function or an assisted driving function is used as an example in the figure), another driving vehicle, a greenbelt, and the like. Optionally, as shown in FIG. 4a, a sensor system may be built in the intelligent device 300, and include a plurality of sensors. For example, the plurality of sensors may include a camera (such as a monocular camera, a binocular camera and an infrared camera), a millimeter wave radar, a laser radar, an IMU, and a vehicle attitude sensor. Data collected by the plurality of sensors may be fused, to obtain more comprehensive and accurate data, and further provide more comprehensive, effective, and accurate road condition analysis, environment sensing, and the like for the intelligent device 300, so as to perform better route planning and driving decision-making, improve driving comfort and safety of the intelligent device 300, and meet an actual requirement for a user of an autonomous driving function.

In addition, the intelligent device 200 may further establish a communication connection to another driving vehicle in the application scenario by using Bluetooth or a wireless network, to obtain data collected by one or more sensors in the another driving vehicle. In addition, the data collected by the one or more sensors in the other driving vehicle may be further fused with data of the plurality of sensors in the intelligent device 200, to provide more comprehensive and multi-directional data for the autonomous driving of the intelligent device 200. Optionally, the intelligent device 200 may further obtain real-time traffic information (including real-time traffic congestion, occurrence of a traffic accident and a status of a traffic indicator) or the like of a road section ahead by using a network, and combine the real-time traffic information with the fused data of the plurality of sensors in the intelligent device 200, to provide more comprehensive and multi-directional data for the autonomous driving, and the like. This is not limited to some embodiments.

Figure 4B:
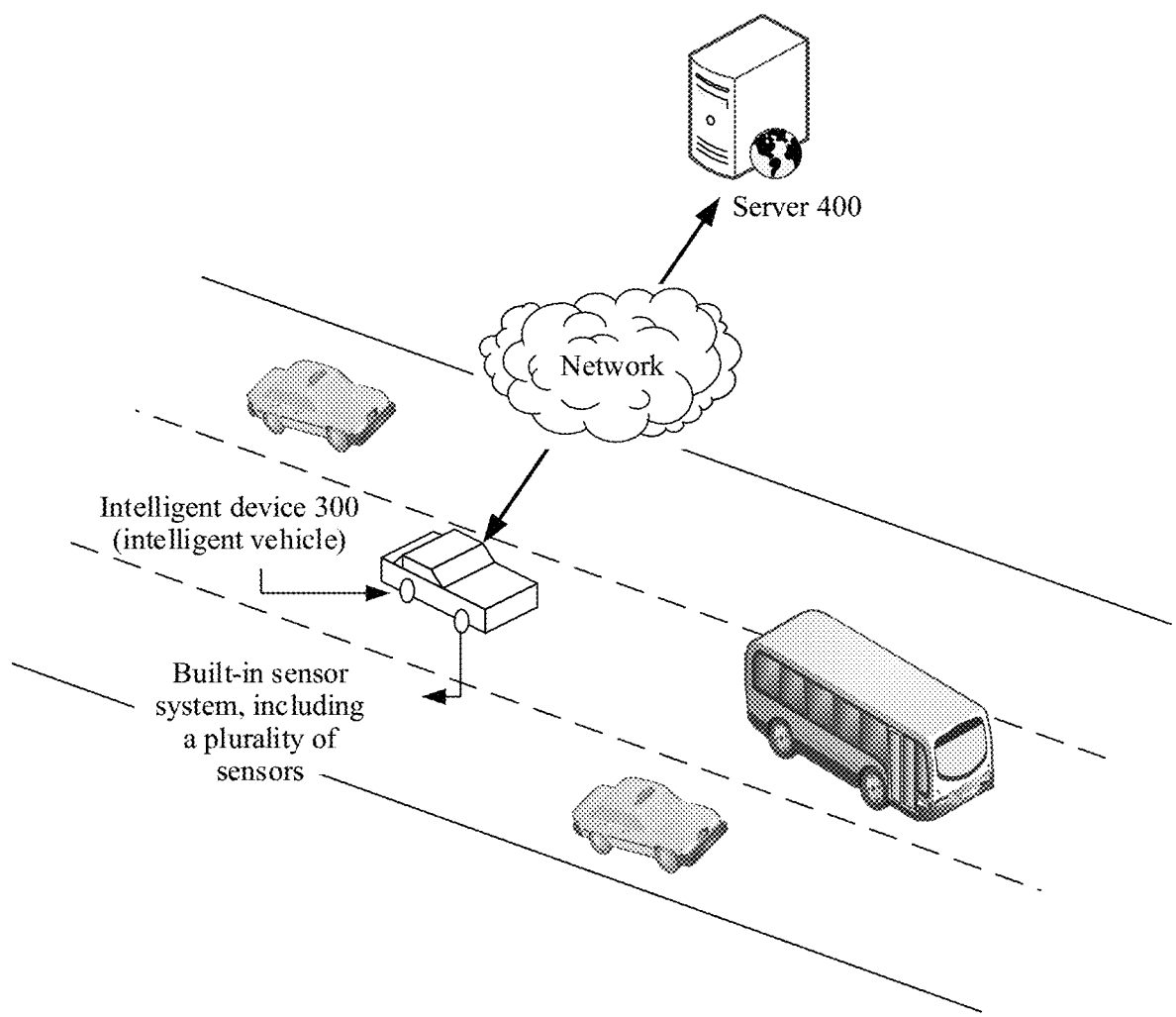
FIG. 4b is a schematic diagram of still another application scenario according to an embodiment of this application.

For example, FIG. 4b is a schematic diagram of still another application scenario according to an embodiment of this application. As shown in FIG. 4b, an intelligent vehicle (namely, the intelligent device 300) may establish a communication connection to a remote server 400 by using a network. Then, the server 400 may obtain, by using the network, data or other information collected by a plurality of sensors in the intelligent vehicle. Optionally, the server 400 may be a server having the foregoing functions, or may be a server cluster including a plurality of servers. Alternatively, the server 400 may be a cloud service center, or the like. This is not limited to some embodiments.

Optionally, the server 400 may run, based on the received data collected by the plurality of sensors in the intelligent vehicle, a program that is related to autonomous driving control of the intelligent vehicle and that is stored in the server 400, to control the autonomous driving intelligent vehicle. The program related to autonomous driving control of the intelligent vehicle may be a program for managing interaction between the autonomous driving intelligent vehicle and an obstacle on the road, a program for controlling a road driving route or a driving speed of the autonomous driving intelligent vehicle, or a program for controlling interaction between the autonomous driving intelligent vehicle and another autonomous driving intelligent vehicle on the road.

In some possible embodiments, after receiving the data collected by the plurality of sensors in the intelligent vehicle, the server 400 may first perform fusion processing on some or all of the sensor data. Then, the server 400 may better send, to the autonomous driving vehicle, a possible driving situation in an environment and a recommended solution (for example, informing the intelligent vehicle of an obstacle ahead and how to bypass the obstacle) based on more accurate and comprehensive road condition analysis obtained after the fusion processing. For example, the server 400 may assist the intelligent vehicle in determining how to travel when facing a specific obstacle in the environment. For example, the server 400 sends, to the intelligent vehicle, a response indicating how the intelligent vehicle should travel in a current scenario. For another example, the server 400 may determine, based on the collected sensor data and data obtained after the data of the plurality of sensors is fused, that there is a temporary stop sign or a "lane closed" sign on the road ahead. Correspondingly, the server 400 may send a recommended operation (for example, planning a driving route, and indicating the intelligent vehicle to change the lane to another road) to the intelligent vehicle, so that the intelligent vehicle passes through while avoiding the obstacle, and the like. Details are not described herein again.

In some embodiments, before the intelligent device 200 fuses the data of the plurality of sensors or before the intelligent device 200 sends the data collected by the plurality of sensors to the server 400, a controller in the intelligent device 300 may perform, by using the communication method provided in embodiments of this application, time synchronization on the plurality of sensors on which data fusion is performed, to ensure accuracy of the data fusion. This avoids a target false alarm, automatic emergency braking, incorrect route planning, or the like. In this way, serious traffic accidents, damage to public infrastructure, harm to personal safety, and the like, that may be caused when data fusion cannot be performed due to asynchronous time of the plurality of sensors, or data with a large difference between actual collection moments is incorrectly fused, is reduced.

Optionally, as shown in FIG. 4b, before the intelligent device 300 fuses the data of the plurality of sensors, or before the intelligent device 300 sends the data collected by the plurality of sensors to the server 400, the intelligent device 300 may further obtain, by using a cloud server, a reference clock used for time synchronization, and send clock information of each sensor to the server 400. Then, the server 400 may perform time synchronization on the plurality of sensors in the intelligent device 300, so that precision of time synchronization can be improved, and a calculation amount at a local end of the intelligent vehicle 300 is reduced. In this way, the intelligent device 300 can better perform other tasks.

As described above, the intelligent device 300 may be an intelligent vehicle that includes a plurality of sensors and has the foregoing functions. The intelligent vehicle may be a vehicle with a fully autonomous driving function, or may be a vehicle with an assisted driving function, or the like, such as a car, a truck, a motorcycle, a bus, a boat, an airplane, a helicopter, a lawn mower, a recreational vehicle, a playground vehicle, a construction device, a trolley, a golf cart, a train, and a handcart. Alternatively, the intelligent device 200 may be another device including a plurality of sensors, or the like. This is not limited to some embodiments.

It should be noted that the communication method provided in this application may be further applied to other scenarios other than the foregoing application scenarios in which data fusion is performed on the plurality of sensors in the intelligent robot and the intelligent vehicle. For example, the communication method may be further applied to an application scenario in which time synchronization is performed on a plurality of sensors to ensure accuracy of analysis and comparison of data collected by the plurality of sensors. For example, absolute time synchronization may be further applied to a storage of video data, so as to compare the application scenario with another external scenario. Details are not described herein again.

Figure 5:
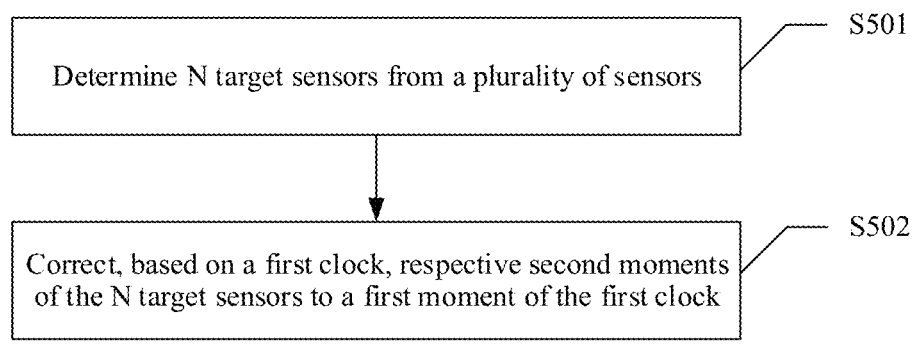
FIG. 5 is a schematic flowchart of a communication method according to an embodiment of this application.

FIG. 5 is a schematic flowchart of a communication method according to an embodiment of this application. The method may be applied to the system architecture shown in FIG. 2c and the application scenario shown in FIG. 3, FIG. 4a, or FIG. 4b, and may be applied to the intelligent device 200 or the intelligent device 300 in FIG. 3, FIG. 4a, or FIG. 4b. The intelligent device 200 or the intelligent device 300 may include a plurality of sensors. The following provides description with reference to FIG. 5 by using an example in which an execution body is the controller 1005 in FIG. 2c. The method may include the following steps S501 and S502.

Step S501: Determine N target sensors from the plurality of sensors.

The controller determines the N target sensors from the plurality of sensors of the intelligent device, where N is an integer greater than 1. Each of the N target sensors may be a sensor configured to perform processing such as data fusion, so that time synchronization needs to be performed.

Step S502: Correct respective second moments of the N target sensors to a first moment of a first clock.

The controller corrects the respective second moments of the N target sensors based on the first clock, to obtain a first moment corresponding to each second moment. Each first moment is a moment obtained after time synchronization is performed based on the first clock, and each second moment is a moment before time synchronization is performed based on the first clock. The sensor 1001 and the sensor 1002 are used as an example. It is assumed that a first moment of the first clock (namely, a system standard clock) is $T_{1,1}$, a second moment of the sensor 1001 is $T_{1,2}$, and a second moment of the sensor 1002 is $T_{2,2}$, $T_{1,2}$ and $T_{2,2}$ of the sensor 1001 and the sensor 1002 are corrected to $T_{1,1}$.

By using the method, time synchronization of the plurality of sensors in the intelligent device can be implemented, to ensure accurate fusion of data collected by different sensors.

The following provides detailed examples with reference to FIG. 6, FIG. 7, FIG. 8, and FIG. 9.

Figure 6:
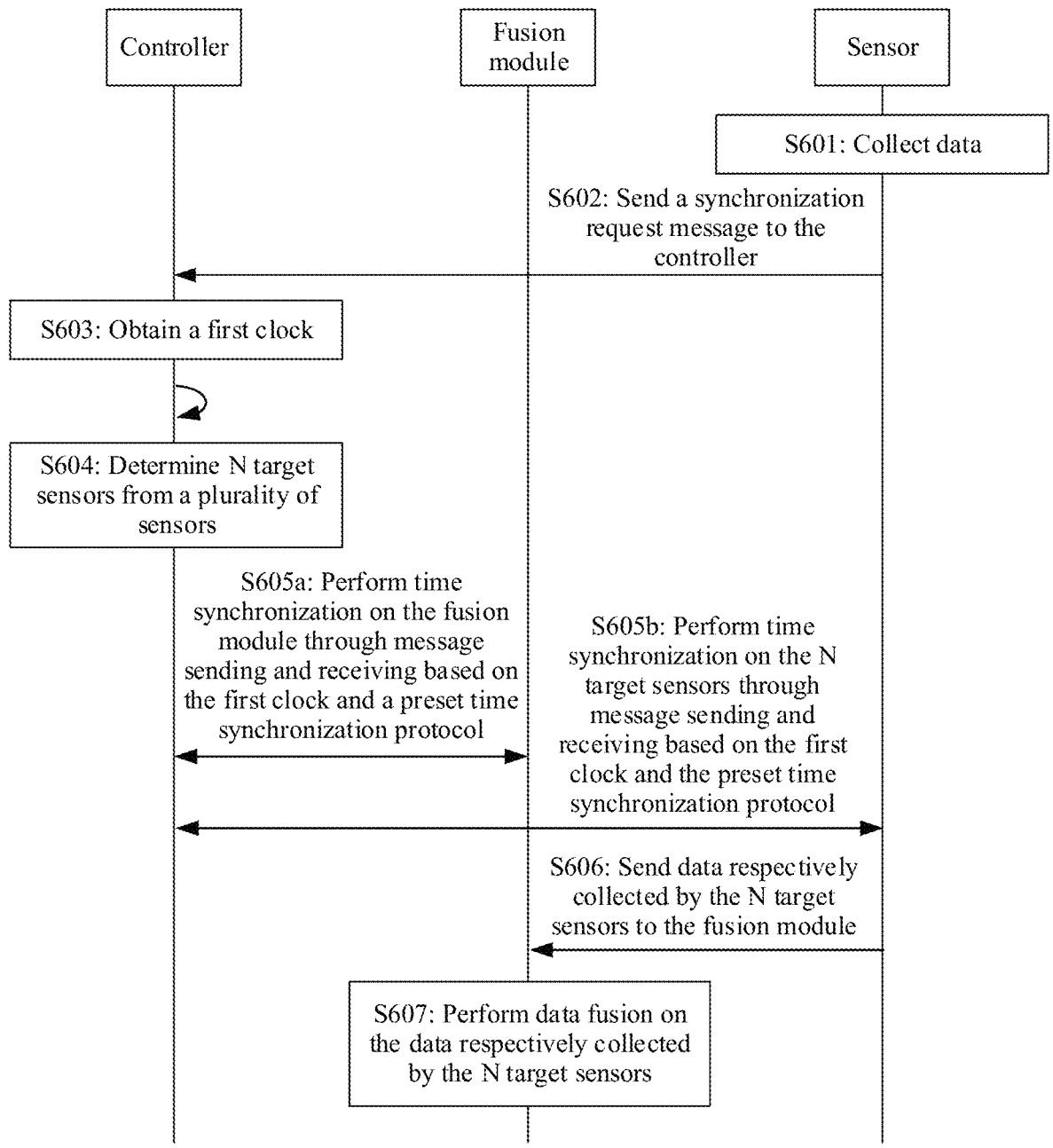
FIG. 6 is a schematic flowchart of another communication method according to an embodiment of this application.

FIG. 6 is a schematic flowchart of another communication method according to an embodiment of this application. A time synchronization mode in some embodiments may be a reactive mode. To be specific, as shown in FIG. 6, a sensor may send a time synchronization request message to a controller after collecting data, to trigger the controller to perform time synchronization. As shown in FIG. 6, the method may include the following steps.

Step S601: Collect data.

M target sensors in a plurality of sensors of the intelligent device may complete data collection at respective second moments.

Step S602: Send a synchronization request message to the controller. Correspondingly, the controller receives the synchronization request message.

The M target sensors in the plurality of sensors of the intelligent device may send the time synchronization request messages to the controller after completing the data collection at the respective second moments.

Step S603: The controller obtains a first clock.

After receiving the synchronization request messages sent by the M target sensors, to trigger a time synchronization procedure, the controller may first obtain the first clock used for time synchronization. The first clock may be a clock of the controller.

Step S604: Determine N target sensors from the plurality of sensors.

The M target sensors may belong to the N target sensors. M is an integer greater than or equal to 1. After receiving the time synchronization request messages sent by the M target sensors, the controller may determine, from the plurality of sensors of the intelligent vehicle based on the M target sensors and a preset fusion rule, N–M target sensors configured to perform data fusion with the M target sensors. The N–M target sensors belong to the N target sensors. In other words, the N target sensors are finally determined from the plurality of sensors of the intelligent vehicle. For example, M is equal to 1, and the M target sensors are, for example, equivalent to one camera. Generally, the camera has strong resolution and excellent target classification categorization, but cannot perform accurate distance measurement and speed measurement due to a loss of depth information. However, a millimeter wave radar in the intelligent vehicle has a high capability in distance measurement and speed measurement accuracy, but performs poorly in classification categorization. The camera and the millimeter wave radar have complementary functions, so that based on a data complementary fusion rule, it may be determined that the millimeter wave radar in the intelligent vehicle may be used to perform data fusion with the camera (the millimeter wave radar and the camera are the N target sensors). Therefore, time synchronization may be performed on the camera and the millimeter wave radar subsequently, to ensure accuracy of data fusion between the camera and the millimeter wave radar. In this way, more comprehensive road condition analysis and environment sensing are provided for the intelligent vehicle, and driving comfort and safety are improved.

In some embodiments, the time synchronization may be triggered when the sensor has a time synchronization requirement, thereby reducing unnecessary time synchronization, reducing a calculation amount, and the like. At the same time, it can be further ensured that time synchronization is performed before each data fusion, to ensure accuracy of each data fusion. In addition, the sensor may further maintain a time synchronization cycle. After a specific time synchronization cycle is exceeded, even if the sensor does not collect data, the sensor may send a synchronization request message to the controller, to trigger the controller to perform time synchronization, so as to effectively avoid the risk caused by not performing time synchronization for a long period of time, and the like. This is not limited to some embodiments.

It should be noted that time of completing data collection by a sensor is set differently based on different sensors. For example, for the camera, time of completing data collection is generally a time of completing exposure. For the millimeter wave radar, time of completing data collection is a time of collecting an effective radar cross section (RCS) point. After collecting data, the sensor may add a corresponding timestamp to the data, to indicate a collection moment (or a collection completion moment) of the current sensor data. For example, the respective second moments of the M target sensors are moments at which the M target sensors respectively collect data. It may be understood that, because the M target sensors have not performed time synchronization at this time, the respective second moments of the M target sensors are moments determined based on respective clocks of the M target sensors before time synchronization.

Figure 7:
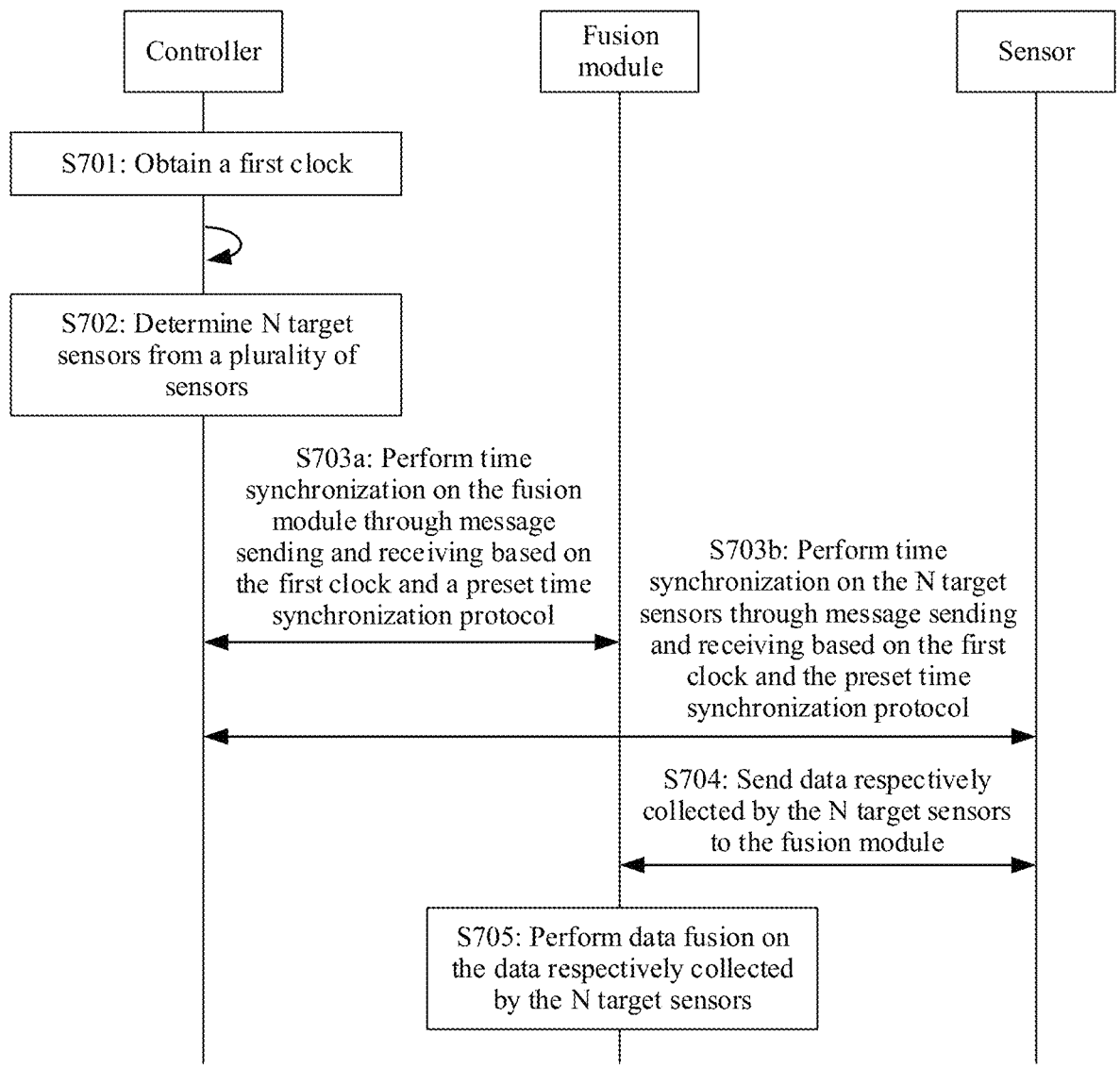
FIG. 7 is a schematic flowchart of still another communication method according to an embodiment of this application.
Figure 8:
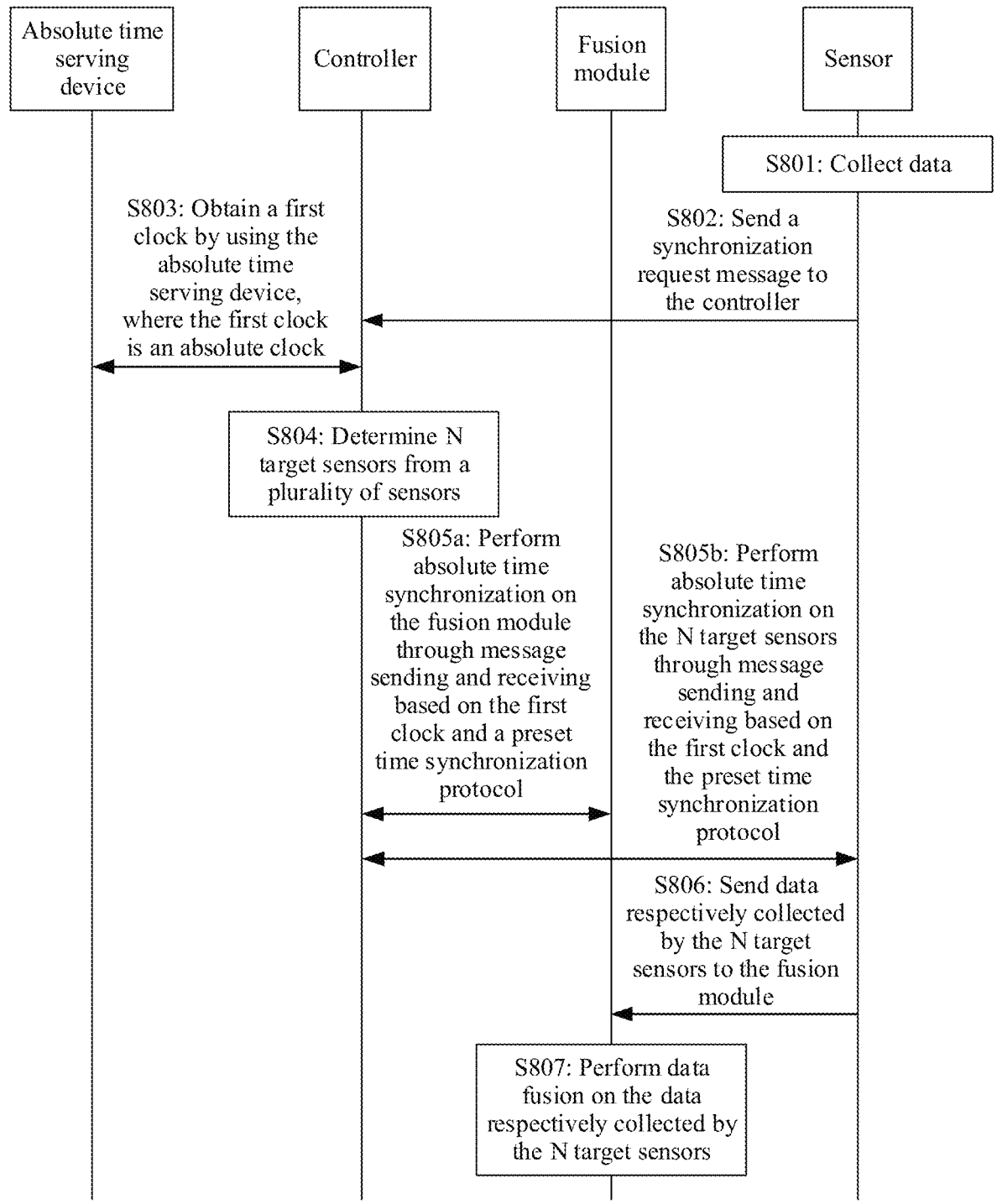
FIG. 8 is a schematic flowchart of still another communication method according to an embodiment of this application.
Figure 9:
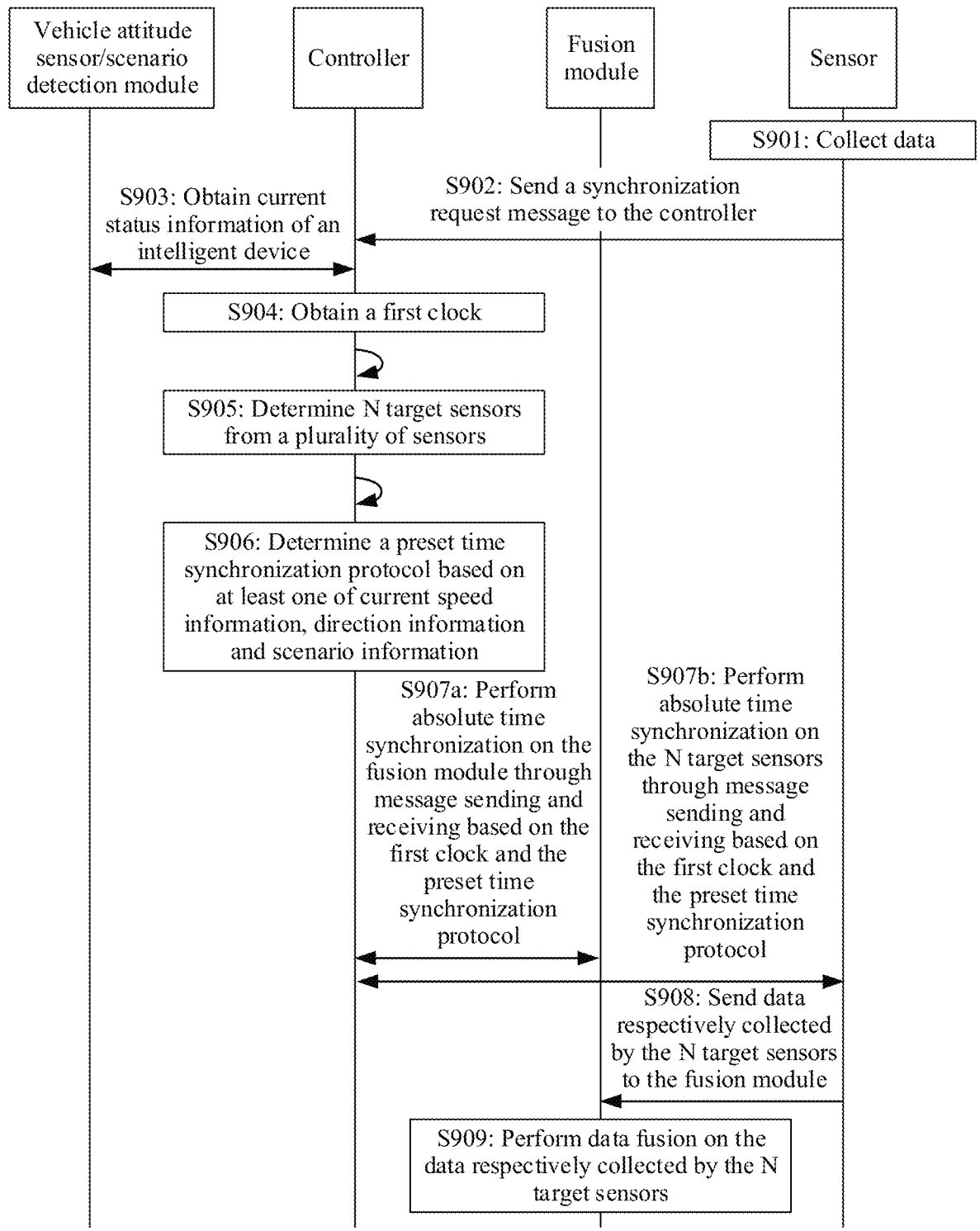
FIG. 9 is a schematic flowchart of still another communication method according to an embodiment of this application.

It should be noted that a sequence of performing step S603 and step S604 in FIG. 6 is not limited to some embodiments. Corresponding steps in FIG. 7, FIG. 8, and FIG. 9 are similar, and details are not described herein again.

Step S605a: The controller performs, based on the first clock and a preset time synchronization protocol (for example, a time synchronization protocol such as gPTP and NTP), time synchronization for a fusion module through message sending and receiving.

Step S605b: The controller performs, based on the first clock and the preset time synchronization protocol (for example, the time synchronization protocol such as gPTP and NTP), time synchronization for the N target sensors through message sending and receiving.

The controller may first determine clock frequency offsets between respective clocks of the N target sensors and the first clock and determine respective transmission delays of the N target sensors based on the preset time synchronization protocol. The transmission delay is a transmission delay from the N target sensors to the controller. Then, the controller may perform time synchronization on the N target sensors based on the clock frequency offsets between the respective clocks of the N target sensors and the first clock, and the respective transmission delays of the N target sensors. Time synchronization of the fusion module is similar, and details are not described herein again. For example, using the gPTP time synchronization protocol as an example, the controller may first send a first synchronization message (e.g., sync message) to the N target sensors. After the N target sensors receive the first synchronization message, a first receiving moment t1 of the first synchronization message may be determined based on respective local clocks of the N target sensors, and then the controller sends a follow_up message to notify the N target sensors of a first sending moment t2 (the first sending moment t2 is determined by a clock of the controller, that is, is determined by the first clock) of the first synchronization message. Then, the controller may send a second synchronization message to the N target sensors. After receiving the second synchronization message, the N target sensors may determine a second receiving moment t3 of the second synchronization message based on respective local clocks, and then the controller sends a follow_up message to notify the N target sensors of a second sending moment t4 (the second sending moment is determined by a clock of the controller, that is, determined by the first clock) of the second synchronization message. Details are not described herein again. Finally, a clock frequency offset between the first clock and a local clock of a target sensor may be obtained through calculation by using a formula $R=(t4-t2)/(t3-t1)$, where R is the clock frequency offset between the first clock and the local clock of the target sensor. Measurement of a transmission delay is not described in detail herein. Refer to a specific time synchronization protocol.

Optionally, the fusion module may be used as a software module, and may be integrated into the controller, or may be integrated into a single sensor (for example, any one of the N target sensors). It may be understood that if the fusion module is integrated into the controller, the fusion module may directly use the first clock of the controller, so that time synchronization does not need to be performed, or the like. This is not limited to some embodiments.

It should be noted that a sequence of performing step S605a and step S605b is not limited, and step S605a and step S605b may alternatively be performed simultaneously. Corresponding steps in FIG. 7, FIG. 8, and FIG. 9 are similar, and details are not described herein again.

As described above, respective second moments of the M target sensors in the N target sensors are moments determined based on respective clocks of the M target sensors before time synchronization. The respective second moments of the N−M target sensors in the N target sensors may be moments determined by respective clocks of the N−M target sensors in the time synchronization process. In other words, respective second moments of the N−M target sensors are moments before time synchronization is performed based on the first clock. As described above, the M target sensors may complete data collection before the N−M target sensors, and complete data collection before current time synchronization, and the N−M target sensors may complete data collection after current time synchronization.

In this case, a timestamp corresponding to each piece of the data collected by the N−M target sensors is a data collection moment after time synchronization. For example, if the N−M target sensors complete data collection at respective third moments, each third moment is a moment obtained after time synchronization is performed based on the first clock.

Step S606: The N target sensors send respective collected data to the fusion module.

Step S607: The fusion module performs data fusion on the data respectively collected by the N target sensors.

In this way, after time synchronization is performed on the N target sensors, data fusion is performed on the data of the N target sensors, to effectively ensure accuracy of data fusion.

FIG. 7 is a schematic flowchart of still another communication method according to an embodiment of this application. As shown in FIG. 7, the method may include the following steps.

Step S701: The controller obtains a first clock.

A time synchronization mode in some embodiments may be a predictive (e.g., proactive) mode. To be specific, as shown in FIG. 7, a sensor does not need to send a time synchronization request, and the controller may periodically trigger a time synchronization procedure based on a preset time synchronization cycle. Optionally, the controller may record time for performing time synchronization each time, to trigger time synchronization again after a cycle elapses. This is not limited to some embodiments. In this way, periodic time synchronization can avoid a risk caused by not performing time synchronization for a long time when the sensor does not send a synchronization request message within a long period of time or the controller does not receive a synchronization request message sent by the sensor. In addition, a single occurrence of time synchronization can usually be maintained for a period of time. Therefore, when the sensor collects data at a high frequency, that is, when the sensor sends synchronization requests frequently, periodic time synchronization can reduce unnecessary time synchronization.

Optionally, after periodically triggering the time synchronization procedure based on the preset time synchronization cycle, the controller may first obtain the first clock used for time synchronization. The first clock may be a clock of the controller.

Step S702: Determine N target sensors from a plurality of sensors.

As described above, in this solution, the sensor does not need to send a time synchronization request to trigger time synchronization. Instead, by periodically performing time synchronization, the controller may determine the N target sensors from a plurality of sensors of an intelligent device based on a preset fusion requirement (or another requirement that needs to perform time synchronization in advance). For example, data fusion needs to be performed for presetting data of a camera and a millimeter wave radar. To ensure accuracy of data fusion between the camera and the millimeter wave radar, time synchronization needs to be performed on the camera and the millimeter wave radar. In other words, it may be determined that the camera and the millimeter wave radar are the N target sensors. Optionally, for a specific description of step S702, refer to the description of step S604. Details are not described herein again.

It should be noted that a sequence of performing step S701 and step S702 in FIG. 7 is not limited to some embodiments. In other words, an execution sequence of obtaining the first clock and determining the N target sensors is not limited to some embodiments. Corresponding steps in FIG. 8 and FIG. 9 are similar, and details are not described herein again.

Optionally, for step S703a and step S703b, refer to step S605a and step S605b respectively. Details are not described herein. It should be noted that a sequence of performing step S703a and step S703b in FIG. 7 is not limited, step S703a and step S703b may alternatively be performed simultaneously, and the like.

For step S704 and step S705, refer to step S606 and step S607 respectively. Details are not described herein. It should be noted that a sequence of performing step S704 and step S705 in FIG. 7 is not limited, and step S704 and step S705 may alternatively be performed simultaneously.

The time synchronization in some embodiments may be relative time synchronization or absolute time synchronization; and if the time synchronization is the relative time synchronization, the first clock is a relative clock: or if the time synchronization is the absolute time synchronization, the first clock is an absolute clock. The time synchronization performed in FIG. 5, FIG. 6, and FIG. 7 may be relative time synchronization, and the first clock may be a relative clock.

FIG. 8 is a schematic flowchart of still another communication method according to an embodiment of this application. A reactive mode is used as an example in FIG. 8. As shown in FIG. 8, the method may include the following steps.

For steps S801 and S802, refer to step S601 and step S602 respectively. Details are not described herein again.

Step S803: The controller obtains a first clock by using an absolute time serving device.

The controller may obtain the first clock by connecting to the absolute time serving device, where the first clock is an absolute clock. For example, in a scenario in which an operation such as absolute time synchronization is performed based on a detection characteristic, an absolute time synchronization requirement of detection data between different sensors usually needs to be considered. In this case, the controller may obtain an absolute clock by using an absolute time serving device (for example, a GPS), to perform absolute time synchronization on the N target sensors. Optionally, the controller may send a request to the absolute time serving device, to obtain an absolute clock used for absolute time synchronization. Optionally, the controller may also store time (which may be absolute time determined by the absolute clock) that the N target sensors and the fusion module perform absolute time synchronization each time, and periodically perform absolute time synchronization on the N target sensors and the fusion module based on a specific absolute time synchronization cycle. This avoids a case in which time between sensors is out of synchronization again after a period of time, and reduces a risk caused by not performing time synchronization for a long period of time.

For step S804, step S805a, step 805b, step S806, and step S807, refer to step S604, step S605a, step 605b, step S606, and step S607 respectively. Details are not described herein again.

It should be noted that, a difference between the steps related to FIG. 8 and the steps related to FIG. 6 lies in that time synchronization in FIG. 8 is an absolute time synchronization.

FIG. 9 is a schematic flowchart of still another communication method according to an embodiment of this application. A reactive mode is used as an example in FIG. 9. As shown in FIG. 9, the method may include the following steps.

For step S901 and step S902, refer to step S801 and step S802 respectively. Details are not described herein.

Step S903: The controller obtains current status information of the intelligent device, where the status information may include at least one of speed information, direction information, and scenario information.

After receiving the synchronization request message and triggering a time synchronization procedure, the controller may obtain the current status information of the intelligent device by using a vehicle posture sensor, a scenario detection module, and the like in the intelligent device.

Optionally, the controller may send a request message to the vehicle posture sensor and the scenario detection module, to obtain corresponding vehicle posture information (for example, including the speed information and the direction information) and the scenario information. For example, the intelligent vehicle is used as an example. The speed information may include information such as a speed and a gear at which the intelligent vehicle currently travels. The direction information may include information such as a current wheel angle, turning left, turning right, or turning around of the intelligent vehicle. The scenario information may be, for example, information about a driving environment in which the intelligent vehicle is currently located, for example, information about a straight lane, a left-turn lane, a right-turn lane, a U-shaped curve or turn, a bridge, a muddy road, and a highway. Optionally, for example, in a straight lane scenario, the intelligent vehicle may predominantly use an ACC (a longitudinal control function), and in a left-turn lane scenario, a right-turn lane scenario, or a U-shaped curve or turn scenario, the intelligent vehicle may predominantly use a LCC (a lateral control function).

For steps S904 and S905, refer to step S604 and step S605 respectively. Details are not described herein again.

Step S906: The controller determines a preset time synchronization protocol based on the current status information of the intelligent device.

After the current status information of the intelligent device is obtained, for example, at least one of the speed information, the direction information, and the scenario information, the preset time synchronization protocol may be determined based on the at least one of the speed information, the direction information, and the scenario information. That is, a time synchronization protocol to be used for current time synchronization is determined. Optionally, the time synchronization protocol may belong to a time synchronization protocol set, and the time synchronization protocol set may include a common gPTP and an NTP, and may further include another feasible time synchronization protocol such as a TPSN and RBS. This is not limited to some embodiments.

The intelligent vehicle is used as an example. It may be understood that, in different driving scenarios or driving states, the intelligent device usually has different requirements for precision of time synchronization. For example, in a scenario in which precision of time synchronization is high, such as a curve, especially a U-shaped curve or turn, time synchronization that does not meet a requirement usually causes a large detection deviation of a target detection position. In this case, the gPTP having a high time synchronization precision may be selected to perform time synchronization on the plurality of sensors. For another example, when a vehicle speed is high or a gear is high, a requirement for time synchronization is high, and time synchronization that does not meet a requirement causes poor speed fusion effect of a target vehicle. In this case, the gPTP having a high time synchronization precision may be selected to perform time synchronization on the plurality of sensors. For another example, a lateral control function such as LCC (mostly in a curve scenario) has a high requirement on time synchronization than a longitudinal control function such as ACC (mostly in a straight-lane scenario), and time synchronization that does not meet the requirements may cause failure of the lateral function control. In this way, when it is detected that the current intelligent vehicle is in lane centering control, the gPTP having a high time synchronization precision may be selected to perform time synchronization on the plurality of sensors. When it is detected that the current intelligent vehicle is in ACC, the NTP having a low time synchronization precision may be selected to perform time synchronization on the plurality of sensors. In this way, an actual requirement for time synchronization precision can be met when the plurality of sensors are not used. In addition, a calculation amount and costs can be reduced by using a time synchronization protocol with low precision when the precision requirement is low:

Optionally, in addition to determining the preset time synchronization protocol based on at least one of the speed information, the direction information, and the scenario information, in some possible embodiments, the controller may further determine a used time synchronization protocol based on a precision requirement of performing data fusion by a sensor. Optionally, if precision of performing data fusion on the N target sensors is high, (for example, fusion of data of the camera and the millimeter wave radar requires high fusion precision), a time synchronization protocol having a high time synchronization precision (for example, gPTP) can be selected to ensure accuracy of the data fusion. Optionally, if precision of performing data fusion on the N target sensors is low; a time synchronization protocol (for example, NTP) having a low time synchronization precision may be selected to ensure accuracy of the data fusion on the N target sensors, and reduce unnecessary costs and a calculation amount. Details are not described herein again.

It should be noted that a sequence of performing step S904, step S905 and step S906 in FIG. 9 is not limited to some embodiments. In some possible embodiments, step S906 may be first performed. In other words, a time synchronization protocol used for current time synchronization may be first determined based on at least one of current speed information, direction information, and scenario information of the intelligent device, and then a first clock used for time synchronization is obtained, and N target sensors for time synchronization are determined, and the like. This is not limited to some embodiments.

In conclusion, optionally, in some possible embodiments, time synchronization may further be directly performed on all of the plurality of sensors in the intelligent device. For example, in an intelligent vehicle scenario, after the user starts the intelligent vehicle, the controller in the intelligent vehicle may immediately perform time synchronization on all or some of the sensors used for data fusion in the intelligent vehicle, to ensure that accurate data required for autonomous driving is provided. This is not limited to some embodiments. Optionally, in some possible embodiments, time synchronization may be further performed on one or more time-out-of-synchronization sensors in the N target sensors, or the like. In addition, if a target sensor on which data fusion needs to be performed is changed after a period of time, and one or more target sensors are added or removed, time synchronization may be performed on a plurality of target sensors determined after the change. This is not limited to some embodiments.

For step S907a, step 907b, step S908, and step S909, refer to step S805a, step 805b, step S806, and step S807 respectively. Details are not described herein again.

An embodiment of this application provides a communication method. In an intelligent device including a plurality of sensors, time synchronization may be performed, based on a reference clock, on respective local clocks of some or all of the sensors. In this way, when data fusion or data comparison needs to be performed on data collected by some or all of the sensors, because time of the sensors is synchronized, accuracy of time information of the data collected by the sensors can be ensured. In this way, accuracy of the data fusion or data comparison can be ensured, for example, the data fusion can be ensured to be effective fusion for a same scenario. For example, in the autonomous driving scenario, in some embodiments, accurate and effective fusion processing may be performed on data of the plurality of time-synchronized sensors, to obtain more comprehensive and accurate road condition analysis, environment sensing, and the like, and improve driving comfort and safety.

It should be noted that this application aims to provide a communication method. Time synchronization is performed on a plurality of sensors, to ensure accuracy and reliability of data of each sensor on time, and further improve effective and accurate processing of the data respectively collected by the plurality of sensors. An actual application scenario is not limited to some embodiments. Data of each time-synchronized sensor may be used for data fusion, data comparison and analysis, any other possible processing, or the like. This is not limited to some embodiments.

Figure 10:
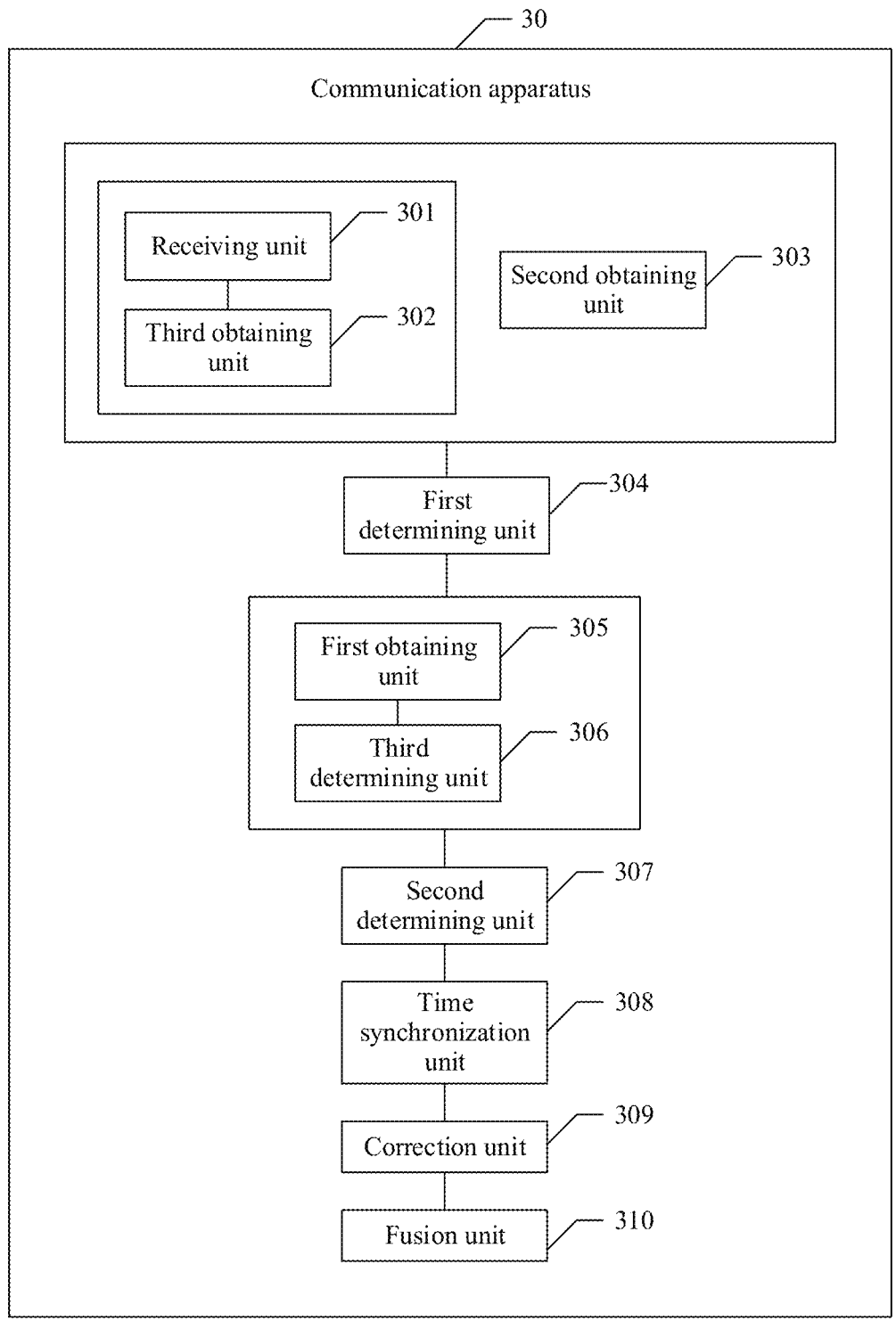
FIG. 10 is a schematic diagram of a structure of a communication apparatus according to an embodiment of this application.

FIG. 10 is a schematic diagram of a structure of a communication apparatus according to an embodiment of this application. The communication apparatus may be applied to an intelligent device, and the intelligent device may include a plurality of sensors. The communication apparatus may include an apparatus 30. As shown in FIG. 10, the apparatus 30 may include a first determining unit 304 (e.g., determining circuit) and a correction unit 309 (e.g., correction circuit). The units (e.g., circuits, modules) are described in detail as follows.

The first determining unit 304 is configured to determine N target sensors from the plurality of sensors, where N is an integer greater than 1.

The correction unit 309 is configured to correct, based on a first clock, respective second moments of the N target sensors to a first moment of the first clock.

In a possible implementation, the apparatus further includes: a second determining unit 307 (e.g., determining circuit), configured to determine clock frequency offsets between respective clocks of the N target sensors and the first clock and determine respective transmission delays of the N target sensor based on a preset time synchronization protocol: and a time synchronization unit 308 (e.g., time synchronization circuit), configured to perform time synchronization on the N target sensors based on the clock frequency offsets between the respective clocks of the N target sensors and the first clock, and the respective transmission delays of the N target sensors.

In a possible implementation, the apparatus further includes: a first obtaining unit 305 (e.g., obtaining circuit), configured to obtain current status information of the intelligent device, where the status information includes at least one of speed information, direction information, and scenario information: and a third determining unit 306 (e.g., determining circuit), configured to determine the preset time synchronization protocol based on the status information, where the preset time synchronization protocol belongs to a time synchronization protocol set, and the time synchronization protocol set includes at least one of a gPTP, a NTP, a TPSN, and RBS.

In a possible implementation, the apparatus further includes: a second obtaining unit 303 (e.g., obtaining circuit), configured to obtain the first clock based on a preset time synchronization cycle.

In a possible implementation, the apparatus further includes: a receiving unit 301 (e.g., receiving circuit), configured to receive synchronization request messages respectively sent by M target sensors in the plurality of sensors, where the synchronization request messages are messages sent after the M target sensors collect data at respective second moments, the M target sensors belong to the N target sensors, and M is an integer greater than or equal to 1: and a third obtaining unit 302 (e.g., obtaining circuit), configured to obtain the first clock based on the synchronization request messages respectively sent by the M target sensors.

In a possible implementation, the first determining unit 304 is configured to: determine, from the plurality of sensors based on the M target sensors and a preset fusion rule, N−M target sensors configured to perform data fusion with the M target sensors, where the N−M target sensors belong to the N target sensors.

In a possible implementation, the time synchronization is relative time synchronization or absolute time synchronization: and if the time synchronization is the relative time synchronization, the first clock is a relative clock: or if the time synchronization is the absolute time synchronization, the first clock is an absolute clock.

In a possible implementation, the apparatus further includes: a fusion unit 310 (e.g., fusion circuit), configured to perform data fusion on data respectively collected by the N target sensors.

It should be noted that, for functions of functional units (e.g., circuits, modules) in the communication apparatus described in some embodiments, refer to related descriptions of step S501 and step S502 in the method embodiment described in FIG. 5 and the related descriptions in the method embodiments described in FIG. 6 to FIG. 9. Details are not described herein again.

Each unit (e.g., circuit, module) in FIG. 10 may be implemented by software, hardware, or a combination thereof. A unit implemented by hardware may include a logic circuit, an algorithm circuit, an analog circuit, or the like. A unit implemented by software may include program instructions, is considered as a software product stored in a memory, and may be run by a processor to implement a related function. For details, refer to the foregoing descriptions.

It may be understood that a connection line between units in FIG. 10 is merely an example, and does not limit a connection relationship between units (e.g., circuits, modules) in some embodiments. Any connection relationship that can implement the functions in embodiments of this application shall fall within the protection scope of embodiments of this application.

Figure 11:
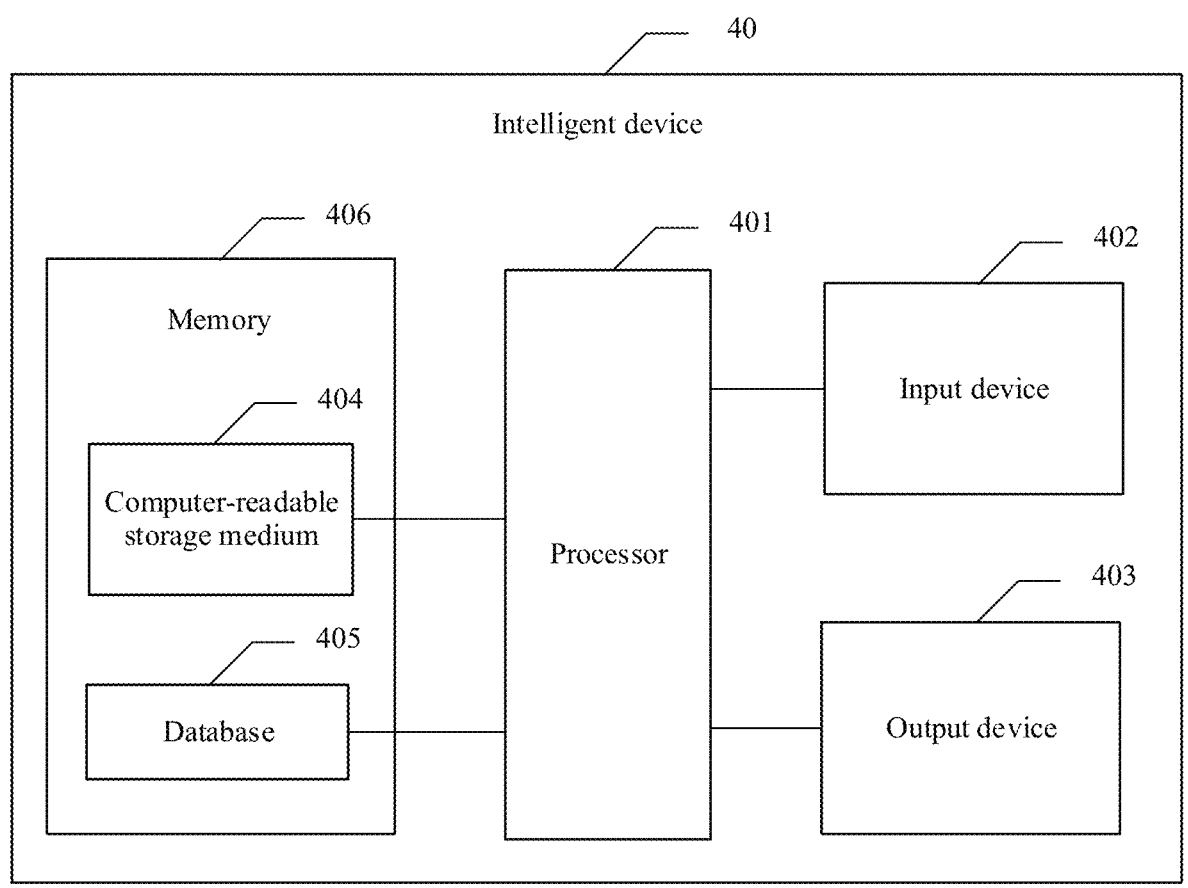
FIG. 11 is a schematic diagram of a structure of an intelligent device according to an embodiment of this application.

Based on descriptions of the foregoing method embodiments and apparatus embodiments, an embodiment of this application further provides an intelligent device. The intelligent device may be the intelligent robot shown in FIG. 3, the intelligent vehicle shown in FIG. 4a and FIG. 4b, or the like, and may include a plurality of sensors. FIG. 11 is a schematic diagram of a structure of an intelligent device according to an embodiment of this application. The intelligent device includes at least a processor 401, an input device 402, an output device 403, and a computer-readable storage medium 404. The intelligent device may further include another common component such as a database 405. Details are not described herein again. The processor 401, the input device 402, the output device 403, and the computer-readable storage medium 404 in the intelligent device may be connected by using a bus or in another manner. The input device 402 may include various sensors, for example, may include a camera (such as an infrared camera or a binocular camera), a laser radar, and a millimeter wave radar. This is not limited to some embodiments.

The processor 401 may be a general-purpose central processing unit (CPU), a microprocessor, an application-specific integrated circuit (ASIC), or one or more integrated circuits configured to control program execution in the foregoing solution.

The memory in the intelligent device may be but is not limited to a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM), a solid state drive (SSD), or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and can be accessed by a computer. The memory may exist independently, and is connected to the processor through the bus. The memory may alternatively be integrated with the processor.

The computer-readable storage medium 404 may be stored in the memory of the intelligent device. The computer-readable storage medium 404 is configured to store a computer program, the computer program includes program instructions, and the processor 401 is configured to execute the program instructions stored in the computer-readable storage medium 404. The processor 401 (or referred to as a CPU) is a computing core and a control core of the intelligent device, and is suitable for implementing one or more instructions, and is suitable for loading and executing one or more instructions to implement a corresponding method flow or a corresponding function. In an embodiment, the processor 401 in some embodiments may be configured to perform a series of processing such as time synchronization, including: determining N target sensors from a plurality of sensors, where N is an integer greater than 1: and correcting respective second moments of the N target sensors to a first moment of a first clock, and the like.

It should be noted that, for functions of functional units (e.g., circuits, modules) in the intelligent device described in some embodiments, refer to step S501 and step S502 in the method embodiment described in FIG. 5 and the related descriptions in the method embodiments described in FIG. 6 to FIG. 9. Details are not described herein again.

In the foregoing embodiments, the description of each embodiment may have respective focuses. For a part that is not described in detail in an embodiment, refer to related descriptions in other embodiments.

An embodiment of this application further provides a computer-readable storage medium (e.g., memory). The computer-readable storage medium is a memory device in an intelligent device, and is configured to store a program and data. It may be understood that the computer-readable storage medium herein may include a built-in storage medium in the intelligent device, and certainly may also include an extended storage medium supported by the intelligent device. The computer-readable storage medium provides storage space, and the storage space stores an operating system of the intelligent device. In addition, the storage space further stores one or more instructions that are suitable for being loaded and executed by the processor 401. These instructions may be one or more computer programs (including program code). It should be noted that the computer-readable storage medium herein may be a high-speed RAM memory, or may be a non-volatile memory, for example, at least one magnetic disk memory: Optionally, the device may be at least one computer-readable storage medium that is located far away from the foregoing processor.

An embodiment of this application further provides a computer program, and the computer program includes instructions. When the computer program is executed by a computer, the computer is enabled to perform some or all steps of any live detection method.

In the foregoing embodiments, the description of each embodiment may have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by people skilled in the art that embodiments described in this specification all belong to preferred embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units (e.g., circuits, modules) is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units (e.g., circuits, modules) described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units (e.g., circuits, modules) in embodiments of this application may be integrated into one processing unit (for example, the determining units, the time synchronization unit, the correction unit, and the fusion unit may be integrated into one processing unit, for example, a processor, and the obtaining units may be integrated into one transceiver unit, for example, in a transceiver), or each unit may exist alone physically, or two or more units may be integrated into one unit. The integrated unit may be implemented in a form of hardware, or may be implemented in a form of a software functional unit.

When the foregoing integrated unit (e.g., integrated circuit) is implemented in the form of a software functional unit and sold or used as an independent product, the integrated unit may be stored in a computer-readable storage medium. Based on this understanding, all or some of the technical solutions of this application may be implemented in a form of a software product. The computer software product is stored in a storage medium, and includes several instructions for enabling a computer device (which may be a personal computer, a server, a network device, or the like, and may be a processor in a computer device) to perform all or some of the steps of the foregoing methods in the embodiments of this application. The foregoing storage medium may include: any medium that can store program code, such as a USB flash drive, a removable hard disk, a magnetic disk, an optical disc, a ROM, or a RAM.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method applied to an intelligent device, wherein the intelligent device comprises a plurality of sensors, and the method comprises:
   determining N target sensors from the plurality of sensors, wherein N is an integer greater than 1;
   determining clock frequency offsets between respective clocks of the N target sensors and a first clock and determining respective transmission delays of the N target sensors based on a preset time synchronization protocol; and
   performing time synchronization on the N target sensors based on the clock frequency offsets between the respective clocks of the N target sensors and the first clock, and the respective transmission delays of the N target sensors;
   wherein the determining of the N target sensors from the plurality of sensors comprises:
   determining, from the plurality of sensors based on M target sensors and a preset fusion rule, N−M target sensors configured to perform data fusion with the M target sensors, wherein the M target sensors belong to the N target sensors, M is an integer greater than or equal to 1, and the N−M target sensors belong to the N target sensors.

2. The method according to claim 1, wherein the method further comprises:
   obtaining current status information of the intelligent device, wherein the status information comprises at least one of speed information, direction information, or scenario information; and
   determining the preset time synchronization protocol based on the status information, wherein the preset time synchronization protocol belongs to a time synchronization protocol set, and the time synchronization protocol set comprises at least one of a generalized precision time protocol (gPTP), a network time protocol (NTP), a time-sync protocol for sensor network (TPSN), or reference broadcast synchronization (RBS).

3. The method according to claim 1, wherein the method further comprises:
obtaining the first clock based on a preset time synchronization cycle.

4. The method according to claim 1, wherein the method further comprises:
receiving synchronization request messages respectively sent by the M target sensors in the plurality of sensors, wherein the synchronization request messages are messages sent after the M target sensors collect data at the respective second moments; and
obtaining the first clock based on the synchronization request messages respectively sent by the M target sensors.

5. The method according to claim 1, wherein the time synchronization is a relative time synchronization or an absolute time synchronization; and when the time synchronization is the relative time synchronization, the first clock is a relative clock; or
when the time synchronization is the absolute time synchronization, the first clock is an absolute clock.

6. The method according to claim 1, wherein the method further comprises:
performing data fusion on data respectively collected by the N target sensors.

7. A communication apparatus applied to an intelligent device, wherein the intelligent device comprises a plurality of sensors, and the apparatus comprises a processor, wherein the processor is coupled to a memory, and the processor is configured to:
determine N target sensors from the plurality of sensors, wherein N is an integer greater than 1;
determine clock frequency offsets between respective clocks of the N target sensors and the first clock and determine respective transmission delays of the N target sensor based on a preset time synchronization protocol; and
perform time synchronization on the N target sensors based on the clock frequency offsets between the respective clocks of the N target sensors and the first clock, and the respective transmission delays of the N target sensors;
adjust, based on a first clock, respective second moments of the N target sensors according to a first moment of the first clock;
wherein the determining of the N target sensors from the plurality of sensors comprises:
determining, from the plurality of sensors based on M target sensors and a preset fusion rule, N–M target sensors configured to perform data fusion with the M target sensors, wherein the M target sensors belong to the N target sensors, M is an integer greater than or equal to 1, and the N–M target sensors belong to the N target sensors.

8. The apparatus according to claim 7, wherein the processor is further configured to:
obtain current status information of the intelligent device, wherein the status information comprises at least one of speed information, direction information, or scenario information; and
determine the preset time synchronization protocol based on the status information, wherein the preset time synchronization protocol belongs to a time synchronization protocol set, and the time synchronization protocol set comprises at least one of a generalized precision time protocol (gPTP), a network time protocol (NTP), a time-sync protocol for sensor network (TPSN), or reference broadcast synchronization (RBS).

9. The apparatus according to claim 7, wherein the processor is further configured to:
obtain the first clock based on a preset time synchronization cycle.

10. The apparatus according to claim 7, wherein the processor is further configured to:
receive synchronization request messages respectively sent by the M target sensors in the plurality of sensors, wherein the synchronization request messages are messages sent after the M target sensors collect data at the respective second moments; and
obtain the first clock based on the synchronization request messages respectively sent by the M target sensors.

11. The apparatus according to claim 7, wherein the time synchronization is a relative time synchronization or an absolute time synchronization; and when the time synchronization is the relative time synchronization, the first clock is a relative clock; or when the time synchronization is the absolute time synchronization, the first clock is an absolute clock.

12. The apparatus according to claim 7, wherein the processor is further configured to:
perform data fusion on data respectively collected by the N target sensors.

13. A non-transitory computer-readable storage medium, wherein the computer-readable storage medium stores a computer program, and when the computer program is executed by a processor, the method according to claim 1 is implemented.

14. A computer program product that includes instructions stored on a memory, wherein when the instructions are executed by a processor, the method according to claim 1 is implemented.

15. A chip system that comprises a communication apparatus, the communication apparatus being configured to implement the method according to claim 1.

16. A communication system that includes a communication apparatus, the communication apparatus being configured to implement the method according to claim 1.

* * * * *

UNITED STATES PATENT AND TRADEMARK OFFICE
CERTIFICATE OF CORRECTION

PATENT NO. : 12,169,233 B2
APPLICATION NO. : 18/325566
DATED : December 17, 2024
INVENTOR(S) : Wei Zhou et al.

Page 1 of 1

It is certified that error appears in the above-identified patent and that said Letters Patent is hereby corrected as shown below:

In the Claims

In Column 36, Claim 1, Line 34, delete "Nis" and insert -- N is --, therefor.

Signed and Sealed this
Fourth Day of February, 2025

Coke Morgan Stewart
*Acting Director of the United States Patent and Trademark Office*